(12) United States Patent  
Eubank et al.

(10) Patent No.: US 12,314,631 B2  
(45) Date of Patent: *May 27, 2025

(54) METHOD AND SYSTEM FOR ADJUSTING SOUND PLAYBACK TO ACCOUNT FOR SPEECH DETECTION

(71) Applicant: Apple Inc., Cupertino, CA (US)

(72) Inventors: Christopher T. Eubank, Mountain View, CA (US); Devin W. Chalmers, Oakland, CA (US); Kirill Kalinichev, San Francisco, CA (US); Rahul Nair, Santa Clara, CA (US); Thomas G. Salter, Foster City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,909

(22) Filed: Oct. 16, 2023

(65) Prior Publication Data

US 2024/0256215 A1 Aug. 1, 2024

Related U.S. Application Data

(63) Continuation of application No. 17/322,691, filed on May 17, 2021, now Pat. No. 11,822,367.

(Continued)

(51) Int. Cl.
*G06F 3/16* (2006.01)
*G06F 3/01* (2006.01)

(Continued)

(52) U.S. Cl.
CPC ............ *G06F 3/165* (2013.01); *G06F 3/013* (2013.01); *G06F 3/017* (2013.01); *G06V 40/19* (2022.01);

(Continued)

(58) Field of Classification Search
CPC .......... G06F 3/165; G06F 3/013; G06F 3/017; G10K 11/1754; G10K 11/17881;

(Continued)

(56) References Cited

U.S. PATENT DOCUMENTS 8,649,526 B2   2/2014  Vernon
8,983,640 B2   3/2015  Yaguez (Continued)

FOREIGN PATENT DOCUMENTS

CN   102624980 A   8/2012
CN   103796125 A   5/2014

(Continued)

OTHER PUBLICATIONS

Chen Hao, "Design and Research of Active Noise Reduction Headphone System Based on DSP", China Excellent Master's Theses, Full Text, Database, Issue 1, dated Jan. 15, 2019, pp. 1-24.

(Continued)

*Primary Examiner* — Vivian C Chin
*Assistant Examiner* — Douglas J Suthers
(74) *Attorney, Agent, or Firm* — Aikin & Gallant, LLP

(57) ABSTRACT

A method performed by an audio system comprising a headset. The method sends a playback signal containing user-desired audio content to drive a speaker of the headset that is being worn by a user, receives a microphone signal from a microphone that is arranged to capture sounds within an ambient environment in which the user is located, performs a speech detection algorithm upon the microphone signal to detect speech contained therein, in response to a detection of speech, determines that the user intends to engage in a conversation with a person who is located within the ambient environment, and, in response to determining that the user intends to engage in the conversation, adjusts the playback signal based on the user-desired audio content.

20 Claims, 9 Drawing Sheets

Related U.S. Application Data

(60) Provisional application No. 63/042,395, filed on Jun. 22, 2020.

(51) Int. Cl.

| | |
|---|---|
| *G06V 40/19* | (2022.01) |
| *G10K 11/175* | (2006.01) |
| *G10K 11/178* | (2006.01) |
| *G10L 25/51* | (2013.01) |
| *G10L 25/78* | (2013.01) |
| *H04R 1/08* | (2006.01) |
| *H04R 1/10* | (2006.01) |
| *H04R 1/40* | (2006.01) |
| *H04R 3/00* | (2006.01) |

(52) U.S. Cl.
CPC .... *G10K 11/1754* (2020.05); *G10K 11/17881* (2018.01); *G10L 25/51* (2013.01); *G10L 25/78* (2013.01); *H04R 1/08* (2013.01); *H04R 1/1041* (2013.01); *H04R 1/406* (2013.01); *H04R 3/005* (2013.01); *G10K 2210/1081* (2013.01); *G10K 2210/3026* (2013.01); *G10K 2210/3027* (2013.01); *G10K 2210/3044* (2013.01); *H04R 2430/01* (2013.01)

(58) Field of Classification Search
CPC ... G10K 2210/1081; G10K 2210/3026; G10K 2210/3027; G10K 2210/3044; G06V 40/19; G10L 25/51; G10L 25/78; H04R 1/08; H04R 1/1041; H04R 1/406; H04R 3/005; H04R 2430/01
USPC .......................................................... 381/57
See application file for complete search history.

(56) References Cited

U.S. PATENT DOCUMENTS

| | | |
|---|---|---|
| 9,774,941 B2 | 9/2017 | Grinker |
| 9,830,930 B2 | 11/2017 | Miller et al. |
| 10,074,355 B2 | 9/2018 | Goldman |
| 11,532,306 B2 | 12/2022 | Kim et al. |
| 11,822,367 B2 | 11/2023 | Eubank et al. |
| 2015/0222987 A1 | 8/2015 | Angel, Jr. et al. |
| 2015/0281830 A1 | 10/2015 | Gauger, Jr. et al. |
| 2015/0302867 A1* | 10/2015 | Tomlin .................... G10L 25/78 704/270 |
| 2017/0142511 A1 | 5/2017 | Dennis |
| 2018/0270571 A1* | 9/2018 | Di Censo ............. G10K 11/175 |
| 2019/0174222 A1 | 6/2019 | Luo et al. |

FOREIGN PATENT DOCUMENTS

| | | |
|---|---|---|
| CN | 110335603 A | 10/2019 |
| CN | 110603588 A | 12/2019 |

OTHER PUBLICATIONS

Chao Sun et al., "An Automated Hearing Test Equipment Based on Active Noise Control Technology", 2019 IEEE International Instrumentation and Measurement Technology Conference (I2MTC), dated Sep. 9, 2019, pp. 1-24.

Nan Li et al., "A Weighted Filtering Error Signal Filtering-A Least Mean Square Algorithm for Active Noise Reduction Earphone", Applied Acoustics, No. 3, dated Jun. 20, 2018, pp. 1-24.

* cited by examiner

METHOD AND SYSTEM FOR ADJUSTING SOUND PLAYBACK TO ACCOUNT FOR SPEECH DETECTION

CROSS-REFERENCE TO RELATED APPLICATIONS

This application is a continuation of co-pending U.S. patent application Ser. No. 17/322,691, filed May 17, 2021, which claims the benefit of priority of U.S. Provisional Patent Application Ser. No. 63/042,395, filed Jun. 22, 2020, which are hereby incorporated by reference in their entirety.

FIELD

An aspect of the disclosure relates to an audio system that adjusts sound playback to account for speech detection. Other aspects are also described.

BACKGROUND

Headphones are an audio device that includes a pair of speakers, each of which is placed on top of a user's ear when the headphones are worn on or around the user's head. Similar to headphones, earphones (or in-ear headphones) are two separate audio devices, each having a speaker that is inserted into the user's ear. Both headphones and earphones are normally wired to a separate playback device, such as an MP3 player, that drives each of the speakers of the devices with an audio signal in order to produce sound (e.g., music). Headphones and earphones provide a convenient method by which the user can individually listen to audio content without having to broadcast the audio content to others who are nearby.

SUMMARY

An aspect of the disclosure is a method performed by an audio system that includes a headset (e.g., over-the-ear headphones, on-the-ear headphones, etc.) to adjust sound playback to account for speech detection. The audio system sends a playback signal containing user-desired audio content, such as music, a podcast, an audiobook, or a movie soundtrack to drive a speaker of the headset that is being worn by a user. The system receives a microphone signal from a microphone that is arranged to capture sounds within an ambient environment in which the user is located. For instance, the microphone may be a part of the headset, or may be a part of another electronic device (e.g., a companion device which is communicatively coupled to the headset). The system performs a speech detection algorithm upon the microphone signal to detect speech contained therein. In response to a detection of speech, the system determines whether the user intends to engage in a conversation with a person who is located within the ambient environment. In response to determining that the user intends to engage in the conversation, the system adjusts the playback signal based on the user-desired audio content.

In one aspect, the system may determine that the user intends to engage in the conversation based a gesture that is performed by the user. For instance, the system may determine, using several microphones (e.g., of a microphone array), a direction of arrival (DoA) of the speech. The system may determine that the user has performed a gesture that indicates that the user's attention is directed towards the DoA. For example, the user may gesture by moving towards the DoA or may gesture by turning towards the DoA. This determination may be based on motion data that indicates movement of the user, which is received from an inertial measurement unit (IMU) sensor. In some aspects, the system may determine that the user intends to engage in the conversation based on whether the user is looking towards the DoA. For instance, the system may obtain a digital image captured by a camera to detect eyes of the user contained therein, and determine that a direction of gaze of the eyes of the user is directed towards the DoA. In another aspect, the system may determine that the user intends to engage in the conversation based on detecting a person who is nearby. In particular, the system captures, using a camera, a scene of the ambient environment and identifies, using an object recognition algorithm upon the image data at least one of 1) the person as being positioned in the scene of the ambient environment and 2) facial expressions of the person that are indicative of speaking.

In one aspect, the system adjusts the playback signal by ducking the playback signal. For instance, the system ducks the signal by applying a scalar gain in order to reduce a sound output level of the speaker. The system may duck the signal when the user-desired audio content includes musical content (or music). In another aspect, the system adjusts the playback signal by pausing the playback signal (or stopping playback entirely). The system may pause when the user-desired audio content includes speech content, such as a podcast, an audiobook, or a movie soundtrack.

Another aspect of the disclosure is a method performed by an audio system that includes a headset. The system sends a playback signal containing user-desired audio content to drive a speaker of the headset that is being worn by the user. The system receives, from a microphone, a microphone signal that contains ambient noise of an ambient environment in which the user is located. The system processes the microphone signal to determine whether the ambient noise is a type of audio content. The system pauses the playback signal when the user-desired audio content is a same type of audio content as the type of audio content of the ambient noise.

In one aspect, the system may receive, from an internal microphone (e.g., a microphone arranged to capture sound at or near the user's ear), a microphone signal that contains sound at the user's ear. The system determines that the sound includes the user-desired audio content and the ambient noise of the ambient environment and determines whether the playback signal may be processed to produce a processed playback signal which when sent to drive the speaker of the headset masks at least a portion of the ambient noise at the user's ear. The playback signal is paused when the user-desired audio content is the same type of audio content as the type of audio content of the ambient noise and when the playback signal cannot be processed to mask the ambient noise at the user's ear.

In some aspects, the system determines whether the playback signal may be processed by determining an ambient noise level of the ambient noise, determining a sound output level (e.g., a sound pressure level (SPL) value) of the speaker at the user's ear (e.g., based on a user-defined volume level or processing an internal microphone signal), determining a masking threshold based on the ambient noise level and the sound level, where the masking threshold is greater than the sound output level, and determining whether the sound output level of the speaker may be increased to at least match the masking threshold based on device characteristics of the headset. In response to determining that the playback signal may be processed, the system processes the playback signal by performing one or more audio processing operations, such as applying a scalar gain, applying equalization operations, and/or performing an ANC operation upon a microphone signal to produce an anti-noise signal.

In some aspects, the system determines that the user-desired audio content includes speech content and determines that the ambient noise drowns out the speech content by masking one or more spectral components of the speech content (e.g., a podcast, an audiobook, or a movie soundtrack). In response, the system pauses the playback signal. In one aspect, the one or more spectral components lie in a range of 100-8,000 Hz.

In one aspect, the operations described herein may be performed by one or more devices of the audio system. For example, the headset of the audio system may perform each of the operations to adjust sound playback to account for speech detection. For instance, the headset may include at least one processor and memory (integrated therein), in which the memory has stored instructions that when executed by the processor causes the headset to perform one or more of the operations described herein. As another example, a companion device (e.g., audio source device 2 of FIG. 1) that is communicatively coupled with the headset may perform at least some of the operations.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
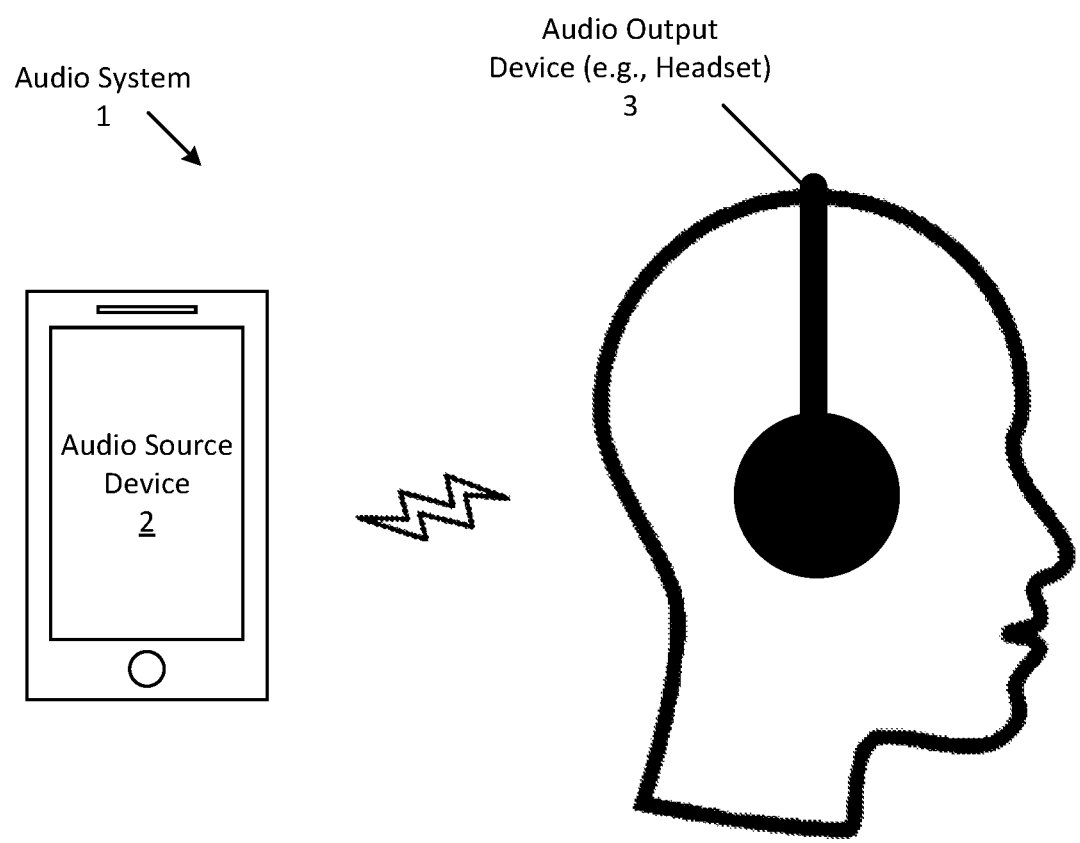
FIG. 1 shows an audio system with an audio source device and an audio output device, and is for adjusting sound playback to account for speech detection according to one aspect.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Audio output devices, such as electronic headsets (or headphones) have become increasingly popular with users, because they reproduce media such as music, podcasts, audiobooks, and movie soundtracks with high fidelity while at the same time not disturbing others who are nearby. Physical features of the headset are often designed to passively attenuate ambient or outside sounds that would otherwise be clearly heard by the user (or wearer) of the headset. Some headsets attenuate the ambient sound significantly, by for example being "closed" against the wearer's head or outer ear, or by being acoustically sealed against the wearer's ear canal; others attenuate only mildly, such as loose fitting in-ear headphones (or earbuds). Although these features may provide a user with a more satisfying sound experience, the attenuation of ambient sounds may have drawbacks. For example, if someone were to attempt to initiate a conversation with the wearer by saying a greeting, such as "Hi.", the wearer may not hear the greeting due to the passive attenuation. This problem may be compounded if the wearer were listening to music which may further mask the greeting. As a result, the person may be forced to say the greeting multiple times (while saying each consecutive greeting louder than the last) until the person gets the wearer's attention. At that point, in order for the wearer to engage in the conversation the wearer may need to manually stop playback of the music (e.g., by pressing a "Stop" button on the headset or on a companion device). Once the conversation is finished, the wearer would continue playing the music (e.g., by pressing a "Play" button). Such actions performed by the wearer may be bothersome and reduce the user experience, especially if the wearer were to engage in several separate conversations during a single use of the headset.

To overcome these deficiencies, the present disclosure describes an audio system that is capable of adjusting the sound playback to account for speech detection. The audio system sends a playback signal containing user-desired audio content to drive a speaker of the headset that is being worn by the user. The system receives a microphone signal from a microphone that is arranged to capture sounds within an ambient environment in which the user is located and performs a speech detection algorithm upon the microphone signal to detect speech contained therein. In response to a detection of speech, the system determines whether the user intends to engage in a conversation with a person who is located within the ambient environment. If so, the system adjusts the playback signal based on the user-desired audio content. Specifically, the system may adjust playback based on the audio content that is currently being played by the system. For instance, if the user-desired audio content includes speech content (e.g., a podcast, an audiobook, a movie soundtrack, etc.), the system may pause the playback signal, since the wearer will be diverting attention away from the audio content and towards the person. If, however, the audio content includes musical content (e.g., a musical composition or music), the system may duck (e.g., apply a scalar gain to) the playback signal in order to reduce the volume of the system. Ducking the signal allows the music to play at a lower volume level, and thereby allowing the wearer to perceive the music in the background while the wearer engages in a conversation. Thus, the audio system adjusts playback based on the user-desired audio content in order to allow the wearer to engage in a conversation while preserving the user experience (e.g., without the user stopping playback or taking off the headset).

Even though headsets provide passive attenuation, unwanted ambient noise may leak into the user's ear (e.g., through an opening between the user's ear and an earpad cushion of the headset). In some instances, the unwanted noise may "clash" with the user-desired audio content of the playback signal by producing an undesirable mixture of sound. For example, a wearer who is listening to music that is playing through the headset, may enter a gymnasium that is playing different music (e.g., different tempo, timbre, lyrics, etc.) that leaks into the user's ear and is mixed with the wearer's music. This musical combination may be undesirable to the wearer since the music playing in the gymnasium may adversely affect the user's experience by masking or muddling the headset's music. As a result, the wearer may be forced to excessively increase the headset's volume in order to drown out the gymnasium's music, which may ultimately do little to cancel out the music. This increase in volume over extended periods of time may result in hearing damage.

The present disclosure describes another aspect in which an audio system detects clashing audio content that is being perceived by a wearer of the headset, and adjusts playback based on the user-desired audio content. In particular, the audio system sends a playback signal containing user-desired audio content to drive a speaker of the headset that is being worn by the user. The system receives, from a microphone, a microphone signal that contains ambient noise of the ambient environment in which the user is located. The system processes the microphone signal to determine whether the ambient noise is a type of audio content. For instance, the system may determine whether characteristics of the noise (e.g., spectral content) correspond to a predefined type of audio content. The system pauses the playback signal when the user-desired audio content is a same type of audio content as the type of audio content of the ambient noise. Returning to the previous example, if user enters the gymnasium that is playback music while the user's headset is playing music and the user may perceive both sounds (e.g., based on a portion of the ambient noise leaking into the user's ear), the system may pause the playback signal since both sounds may clash and therefore may be annoying to the user.

FIG. 1 shows an audio system 1 with an audio source device 2 and an audio output device 3, and is for adjusting sound playback to account for speech detection according to one aspect. In one aspect, either of the devices may perform some or all of the operations to adjust sound playback to account for speech detection, as described herein. In one aspect, the audio system may include other devices, such as a remote electronic server (not shown) that may be communicatively coupled to either the audio source device, the audio output device, or both, and may be configured to perform one or more operations as described herein. As illustrated, the audio output device is a headset (e.g., which may include electronic components, such as one or more processors and memory, integrated therein) that is arranged to direct sound into the ears of the wearer. Specifically, the headset is an over-the-ear headset (or headphones) that is shown to be at least partially covering the user's right ear. In one aspect, the headset may include two headphones (one left and one right), each at least partially covering a respective ear of the user, and arranged to output at least one audio channel (e.g., the right headphone outputting a right audio channel of a two-channel input of a stereophonic recording of audio content, such as a musical work. In another aspect, the audio output device may be at least one in-ear headphone or in-ear earphone. In some aspects, the headphone may be a sealing type that has a flexible ear tip that serves to acoustically seal off the entrance of the user's ear canal from an ambient environment by blocking or occluding in the ear canal. In one aspect, the audio output device is on-the-ear headphones. In another aspect, the output device may be any electronic device that includes at least one speaker and is arranged to be worn by the user and arranged to output sound by driving the speaker with an audio signal.

In another aspect, the audio output device 3 may be a portable device, such as a smart phone. In some aspects, the output device may be a head-mounted device, such as smart glasses, or a wearable device, such as a smart watch. In one aspect, the output device may be any electronic device that is arranged to output sound into the ambient environment. For example, the output device being part of at least one of a stand-alone speaker, a smart speaker, a home theater system, or an infotainment system that is integrated within a vehicle.

The audio source device 2 is illustrated as a multimedia device, more specifically a smart phone. In one aspect, the audio source device may be any electronic device that includes electronic components (e.g., one or more processors and memory integrated therein) and can perform audio signal processing operations and/or networking operations. An example of such a device may include a tablet computer, a laptop computer, a desktop computer, a smart speaker, etc.

As shown, the audio source device 2 is a "companion" device to the audio output device 3, such that the source device is paired (or communicatively coupled) to the output device, via a wireless connection. For instance, the source device may be configured to establish the wireless connection with the audio output device 3 via a wireless communication protocol (e.g., BLUETOOTH protocol or any other wireless communication protocol). During the established wireless connection, the audio source device may exchange (e.g., transmit and receive) data packets (e.g., Internet Protocol (IP) packets) with the audio output device, which may include audio digital data. In another aspect, the audio source device may communicatively couple to the output device via other methods, such as a wired connection.

In some aspects, the audio source device 2 may be a part (or integrated with) the audio output device. For example, as described herein, at least some of the components of the audio source device (such as a controller) may be a part of the audio output device. In this case, each of the devices may be communicatively coupled via traces that are a part of one or more printed circuit boards (PCBs) within the audio output device.

Figure 2:
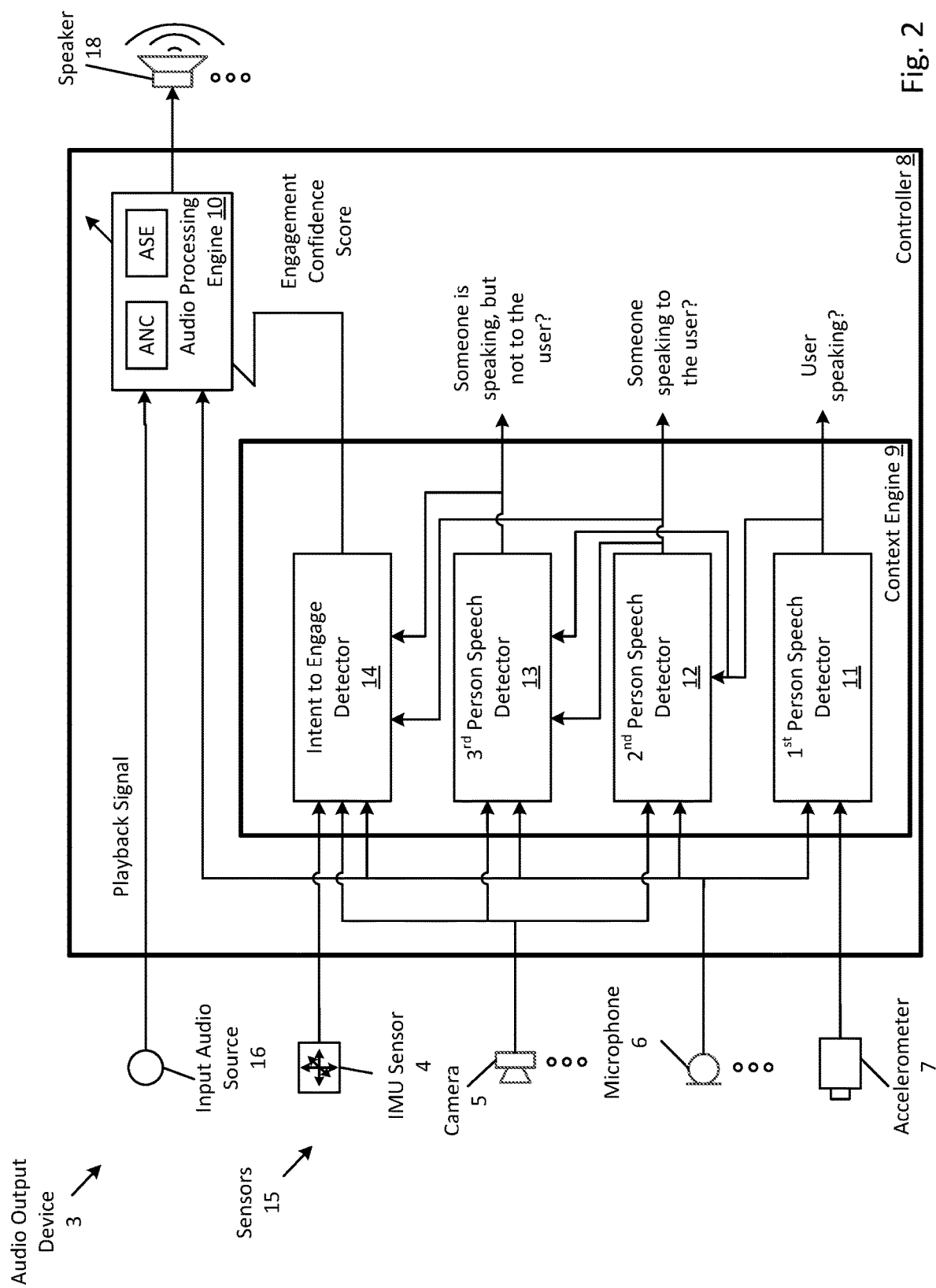
FIG. 2 shows a block diagram of the audio output device according to one aspect.

FIG. 2 shows a block diagram of the audio output device 3 according to one aspect. The audio output device includes one or more components (or electronic devices), such as an input audio source 16, a controller 8, one or more sensors 15, and a speaker 18. As shown, the sensors include an inertial measurement unit (IMU) sensor 4, a camera 5, a microphone 6, and an accelerometer 7. In one aspect, the audio output device may include more or less components. For example, the device may include one or more IMU sensors, cameras, microphones, speakers, and/or accelerometers. As another example, the device may include at least one display screen (e.g., in the case of a head-mounted device) that is configured to present digital images or videos.

In one aspect, although illustrated as being a part of the audio output device 3, at least some of the components described herein may be a part of any electronic device of the audio system 1, such as the audio source device 2. For example, the audio source device may include the input audio source 16, one or more sensors 15, and/or controller 8. In another aspect, the audio source device may perform one or more operations to adjust sound playback, as described herein.

In one aspect, the speaker 18 may be an electrodynamic driver that may be specifically designed for sound output at certain frequency bands, such as a woofer, tweeter, or midrange driver, for example. In one aspect, the speaker may be a "full-range" (or "full-band") electrodynamic driver that reproduces as much of an audible frequency range as possible. In some aspects, the output device may include one or more different speakers (e.g., at least one woofer and at least one full-range driver). In one aspect, the speaker may be arranged to project (or output) sound directly into the user's ear (as is the case with in-ear, on-ear, or over-the-ear headphones. In another aspect, the output device may include one or more "extra-aural" speakers that may be arranged to project sound directly into the ambient environment. In another aspect, the output device may include an array of (two or more) extra-aural speakers that are configured to project directional beam patterns of sound at locations within the environment, such as directing beams towards the user's ears. In some aspects, the (controller 8 of the) output device may include a sound output beamformer that is configured to receive one or more input audio signals (e.g., a playback signal) and is configured to produce speaker driver signals which when used to drive the two or more extra-aural speakers, may produce spatially selective sound output in the form of one or more sound output beam patterns, each pattern containing at least a portion of the input audio signals.

The input audio source 16 may include a programmed processor that is running a media player software application and may include a decoder that is producing one or more playback signals as digital audio input to the controller 8. In one aspect, a playback signal may include user-desired audio content, such as speech content and/or musical content. In one aspect, user-desired audio content is audio content that is selected by the user for playback (e.g., via a user interface that is displayed on a display screen of the audio source device). In one aspect, speech content may include a podcast, an audiobook, or a movie soundtrack, and the musical content may include music. In one aspect, the input audio source may retrieve the playback signal from memory (e.g., of the audio source device 2 or the audio output device 3). In another aspect, the input audio source may stream the playback signal from another source (e.g., over the Internet). In one aspect and as described herein, the programmed processor may be a part of the audio source device 2. In that case, the audio source device 2 may transmit (e.g., via a wireless connection) the playback signals to the audio output device 3. In some aspects, the decoder may be capable of decoding an encoded audio signal, which has been encoded using any suitable audio codec, such as, e.g., Advanced Audio Coding (AAC), MPEG Audio Layer II. MPEG Audio Layer III, or Free Lossless Audio Codec (FLAC). Alternatively, the input audio source 16 may include a codec that is converting an analog or optical audio signal, from a line input, for example, into digital form for the controller. Alternatively, there may be more than one input audio channel, such as a two-channel input, namely left and right channels of a stereophonic recording of a musical work, or there may be more than two input audio channels, such as for example the entire audio soundtrack in 5.1-surround format of a motion picture film or movie. In one aspect, the input source 16 may provide a digital input or an analog input.

In one aspect, each of the sensors 15 is configured to detect input of the ambient environment, and in response produce sensor data. For instance, the IMU sensor 4 is configured to detect movement, and in response produces motion data. For example, the IMU sensor may detect when the user turns and/or moves in a certain direction (e.g., with respect to a reference point), while the output device is worn by the user. In one aspect, the IMU sensor may include at least one accelerometer, gyroscope, and/or magnetometer.

In one aspect, the camera 5 is a complementary metal-oxide-semiconductor (CMOS) image sensor that is capable of capturing digital images as image data that represent a field of view of the camera, where the field of view includes a scene of an environment in which the output device 3 is located. In some aspects, the camera 5 may be a charged-coupled device (CCD) camera type. The camera is configured to capture still digital images and/or video that is represented by a series of digital images. In one aspect, the camera may be an "external" camera that is positioned to capture an outward field of view. For example, the camera may be positioned upon the output device such that it has a field of view that projects outward and in a frontal direction with respect to the user (e.g., in a direction towards which the user's head is pointed). In another aspect, the camera may be positioned differently. For instance, the camera may be an "internal" camera such that it has a field of view that includes at least one physical characteristic (e.g., an eye) of the user who is wearing the device. In some aspects, the system may include more than one camera, such that there is an external and an internal camera.

In one aspect, the microphone 6 (e.g., a differential pressure gradient micro-electro-mechanical system (MEMS) microphone) may be configured to convert acoustical energy caused by sound waves propagating in an acoustic environment into microphone signals. In some aspects, the output device may include a microphone array of two or more microphones. Specifically, the controller 8 may include a sound pickup beamformer that can be configured to process the microphone signals to form directional beam patterns for spatially selective sound pickup in certain directions, so as to be more sensitive to one or more sound source locations. For example, the microphone array may direct a beam pattern towards the user's mouth in order to capture the user's speech, while minimizing undesired sounds and noises within the ambient environment.

In one aspect, the accelerometer 7 is configured to detect movement or vibrations and produce an audio signal as mechanical vibrations. Specifically, the accelerometer is arranged and configured to receive (detect or sense) speech vibrations that are produced while the user is speaking, and produce an accelerometer signal (as an audio signal) that represents (or contains) the speech vibrations. For instance, the accelerometer is configured to sense bone conduction vibrations that are transmitted from the vocal cords throughout the user's head (and/or body), while speaking and/or humming. Thus, in one aspect, the accelerometer may be positioned such that while the output device 3 is worn by the user, it is adjacent to the user's head (e.g., next to the user's ear). In one aspect, however, the accelerometer may be positioned anywhere on or within the output device.

The controller 8 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller may be configured to perform sound playback adjustment operations to account for speech detection, as described herein. Specifically, to perform the operations the controller includes a context engine 9 that is configured to determine whether the user of the audio output device intends to engage in a conversation with another person in the ambient environment. In addition, the controller also includes an audio processing engine 10 that is configured to perform audio signal processing operations upon the playback signal obtained from the input audio source 16 in response to the context engine 9 determining that the user intends to engage in the conversation and based on the audio content of the playback signal. More about these operations are described herein. In one aspect, at least some of the operations performed by each of the engines may be implemented by the controller in software (e.g., as instructions stored in memory of the audio output device 3) and/or may be implemented by hardware logic structures, as described herein. In one aspect, the controller may perform one or more other operations, such as audio signal processing operations.

The context engine 9 includes a first-person speech detector 11, a second-person speech detector 12, a third-person speech detector 13, and an intent to engage detector 14. In one aspect, each of the detectors may be configured to obtain sensor data from one or more sensors 15 to determine who is speaking (or more specifically where a sound source within the environment is located), and whether the user intends to engage in a conversation. A description of each detector is now described herein.

In one aspect, the first-person speech detector 11 is configured to determine whether the user (e.g., wearer of the audio output device 3) is speaking, as opposed to someone who is proximate to the user (e.g., standing in front of the user). The detector is configured to obtain one or more microphone signals from the microphone(s) 6 and obtain an accelerometer signal from the accelerometer 7. The detector determines who is speaking based on at least some of the obtained signals. Specifically, the speech detector 11 is configured to perform a speech detection algorithm upon at least one microphone signal captured by the microphone 6 (which is arranged to sense sounds in the ambient environment) to determine whether there is speech contained therein. For instance, the detector may determine whether the signals contain (e.g., specific) spectral content within a certain frequency range (e.g., a speech frequency range, such as 100 Hz-8,000 Hz) that corresponds to speech. In another aspect, the detector may use any approach to detect speech contained within the microphone signal.

Upon detecting speech, the detector 11 determines whether the speech has come (or originated) from the user. In particular, the speech detector is configured to determine, using one or more microphones, a direction of arrival (DoA) of the speech. In one aspect, the speech detector may estimate the DoA using any DoA estimation method (or speech localization approach), such as a time-delay-based algorithm and beamforming. In one aspect, the DoA may be in any coordinate system (e.g., spherical coordinate system), in which an origin is positioned about the user (e.g., the top of the user's head), or about the audio output device. The detector 11 is also configured to determine whether the accelerometer 7 is producing a signal that is consistent with the user speaking (or humming). For instance, the detector may determine whether the accelerometer is producing a signal that has a magnitude that is above a threshold, which is indicative of the user speaking (e.g., based on bone conduction). The detector may use the DoA and the accelerometer signal to determine the origin of the speech. For example, if the accelerometer is producing a signal that exceeds the threshold and the DoA is pointed towards the user's mouth (e.g., directed forward and downward with respect to the user (or user's head, for example)), the detector may determine that the user is speaking. If, however, the accelerometer signal is below the threshold and/or the DoA is not directed towards a location associated with the user speaking, the detector may determine that the user is not speaking. In one aspect the detector may produce an output (digital) signal that indicates whether or not the user is speaking (e.g., having a high state that indicates the user is speaking and having a low state that indicates the user is not speaking).

The second-person speech detector 12 is configured to determine whether detected speech has originated from someone who is speaking to (or directed towards) the user. The detector is configured to obtain at least one of 1) one or more microphone signals from the microphone(s) 6, 2) image data from one or more camera(s) 5, and 3) an output signal from the first-person speech detector 11. To determine the origin of the speech, the detector 12 may determine the DoA of the speech using the microphone signals. For instance, the detector 12 may perform similar operations as detector 11. In another aspect, the detector 12 may obtain the DoA from the first-person speech detector (or vice versa). The detector may determine that a person is speaking to the user when the DoA is "outward", specifically that the DoA does not originate from the user (e.g., is not directed towards or away from the user's mouth.

In some aspects, the second-person speech detector 12 may determine that a person other than the user is speaking based on identifying at least one of 1) the person within a field of view of the camera 5, and 2) that person is performing physical gestures or facial expressions that are indicative of a person speaking towards another person (which in this case is the user). Specifically, the detector 12 is configured to perform object recognition (e.g., through the use of an object recognition algorithm) upon digital images (image data) captured by the camera 5 in order to detect objects that are captured within the field of view of the camera. For instance, the detector may obtain a digital image of a scene of the ambient environment captured by the camera 5. The detector may process the digital image to identify patterns therein (e.g., structural patterns) and compare them to previously stored patterns (e.g., that are locally stored in memory). Once a matching pattern is found, the detector is said to detect (or identify) the object within the digital image. In one aspect, the speech detector 12 uses object recognition to identify a sound source of the detected speech, such as a person speaking to the user. For instance, the detector 12 may use the object recognition algorithm upon digital images captured by the camera to identify objects that are indicative of a person speaking to another person. The detector may determine whether the algorithm identifies at least one of 1) a person who is positioned within the scene of the ambient environment contained within the digital image and 2) physical gestures or facial expressions of the person that are indicative of speaking towards the user (e.g., the person's mouth moving, the person's eyes being directed towards the user, etc.).

Thus, the second-person speech detector 12 may determine the speech is originating from a person who is speaking to the user when at least one of 1) the DoA is outward, 2) the object recognition algorithm identifies a person who is positioned within the field of view of the camera and is performing physical gestures that are indicative of a person speaking towards the user, and/or 3) the output signal from the first-person speech detector 11 indicates that the user is not speaking (e.g., having a low state). Any one of those conditions may satisfy the determination of the detector 12. In response, the detector 12 may produce an output signal, where a high state (e.g., when at least one of the conditions described herein is satisfied) indicates someone is speaking to the user, and a low state indicates someone is speaking, but not to the user (e.g., which may be based on the person's back facing the user).

In one aspect, the third-person speech detector 13 is configured to determine whether someone is speaking, but this person is not speaking to the user (e.g., whose speech is not directed towards the user). The detector 13 is configured to obtain at least one of 1) one or more microphone signals from the microphone(s) 6, 2) image data from the one or more camera(s) 5, and 3) output signals from the first-person and second-person speech detectors 11 and 12. The detector may determine whether speech is not directed towards the user. For example, a person within the ambient environment who is speaking but is not facing the user (e.g., is facing in a direction away from the user with their back towards the user). In one aspect, the third-person speech detector 13 is configured to determine the DoA of the speech using microphone signals, as described herein, or may obtain the DoA from another speech detector. Similarly, the third-person speech detector is configured to perform object recognition upon digital images captured by the cameras in order to detect objects contained therein. In one aspect, the speech detector may perform object recognition to identify objects contained therein that are indicative of a person speaking to a person other than the user. For example, when the image is captured by a frontal camera, recognizing a person's back facing the user or a profile view of a person who is in front of the user (which may be indicative of the person talking to someone next to the user). In another aspect, the third-person speech detector may obtain the identified objects contained within digital images from another speech detector (e.g., the second-person speech detector 12).

In one aspect, the third-person speech detector 13 may determine the origin of the speech and may determine that a person is speaking to someone other than the user when at least one of 1) the DoA is outward, 2) the object recognition algorithm identifies a person who is positioned within the field of view of the camera but is not facing the user, and 3) the output signals of the first-person and second-person speech detectors indicate that the user is not speaking and that someone is not speaking to the user (e.g., both signals have a low state). In one aspect, the detector may also determine that the origin is of a person who is not speaking to the user by determining that the DoA originates from the identified person who is not facing the user. In response, the detector 13 may produce an output signal, where a high state indicates someone is speaking but not to the user.

In one aspect, one or more of the speech detectors may perform at least some of the operations described herein. For example, if the second-person speech detector 12 determines that someone is talking to the user (e.g., based on object recognition and DoA estimation), the context engine 9 may not perform the operations of the first-person and third-person speech detectors. In another aspect, the context engine 9 may first perform speech detection operations upon one or more microphone signals to detect speech contained therein, before performing the operations of one or more speech detectors. In other words, once speech is detected within the microphone signals, the speech detectors may determine the origin of the speech, as described herein.

In one aspect, the intent to engage detector 14 is configured to determine whether the user intends to engage in a conversation. Specifically, the detector 14 is configured to obtain sensor data (e.g., motion data from the IMU sensor 4, one or more microphone signals from the microphone(s) 6, image data from one or more camera 5), and/or output signals from the second-person speech detector 12 and third-person speech detector 13, and determine whether the user intends to engage in a conversation based on sensor data and/or output signals from one or more speech detectors. In one aspect, the detector 14 may determine whether the user intends to engage in a conversation by determining whether there is speech within the ambient environment that is originating from a sound source other than the user (e.g., another person). Specifically, the detector 14 may determine whether either output signal from the second-person speech detector and the third-person speech detector is in a high state. If so, the engage detector 14 is configured to determine whether the user has performed a gesture indicating that the user's attention is being directed towards the DoA of the detected speech. For example, the detector may obtain motion data from the IMU sensor 4 and may determine (or obtain) the DoA of the speech (as described herein), and use the motion data to determine that the user has performed a gesture, such as moving and turning. In one aspect, the detector may determine that the user's attention is directed (or being directed) towards the DoA when the user performs a (physical) gesture, such as 1) moving towards the DoA (e.g., moving towards the person speaking), 2) turning towards the DoA (e.g., turning towards the person speaking), 3) the user moving with the DoA (e.g., walking alongside the person speaking), or 4) the user stops moving. Thus, the detector may determine that the user intends to engage in a conversation based on whether motion data from the IMU sensor indicates that the user has stopped walking (or slowed down). In some aspects, the determination may be based on a combination of gestures indicated by the motion data, such as the user stopping to walk and turning (or moving) towards the DoA. In one aspect, the detector may determine that the user intends to engage in the conversation upon determining that the user's attention is directed towards the DoA, after moving towards the DoA. For example, the user may intend to engage in the conversation by turning towards the DoA and then looking towards (or pointing towards) the DoA.

In one aspect, the detector 14 may determine that the user intends to engage in a conversation based on additional sensor data. For example, the detector 14 may obtain digital images from the camera 5, and perform object recognition to identify the sound source of the detected speech contained within the images, as described herein. The detector 14 may process (or analyze) the digital images to determine whether the sound source comes into view of the camera, which may indicate that the user is turning towards the source. As another example, when it is determined that the source is someone speaking to the user (e.g., based on the output signal of the second-person speech detector 12), the detector 14 may determine whether the person identified within the digital images is changing throughout a progression of digital images (e.g., getting larger), thereby indicating that the user is moving towards the person speaking. In another aspect, the detector 14 may determine that the user is gesturing towards the DoA based on microphone signals produced by the microphones 6. For example, the controller 8 may determine that the user intends to engage in a conversation when the DoA moves (e.g., based on phase changes in the microphone signals) in an opposite direction as a movement or gesture of the user (e.g., the DoA rotates left with respect to the user, while the user turns right).

In another aspect, the detector may determine that the user intends to engage in a conversation based on eye movement or eye gestures performed by the user. In one aspect, the detector 14 is configured to track the user's eyes that are within a digital image captured by a (e.g., internal) camera. The detector performs an eye tracking algorithm to measure eye positions and/or eye movement of at least one eye in a digital image to determine a direction (or point) of gaze with respect to a reference point. In one aspect, the eye tracking algorithm determines the direction of gaze based on optical tracking of corneal reflections. For example, (e.g., visible, near-infrared, infrared, etc.) light is directed towards eyes of the user, causing reflections in the cornea. A camera captures the reflections, from which a direction of gaze is determined with respect to the output device (e.g., the position of the camera 5). In another aspect, the detector may determine the direction of gaze by keeping track of movements of the (e.g., pupils of the) eyes. In one aspect, the eye tracking algorithm may use any method to determine the direction of gaze of a person. In some aspects, any of these methods may determine the direction of gaze of a user (or wearer) of the output device and/or another person who is facing the user. To determine that the user intends to engage in the conversation based on eye gestures, the detector may determine that a direction of gaze of the user is directed towards the DoA (e.g., for at least a period of time). As another example, the determination may be based on whether the direction of gaze is turning towards the DoA.

In another aspect, the intent to engage may be based on a direction of gaze of another person in the environment. For instance, the intent to engage detector 14 may determine that the user intends to engage in a conversation upon determining that the direction of gaze is directed towards a person identified within the environment (e.g., based on performing object recognition upon one or more digital images. In one embodiment, the intent may be based on whether the user and the person have established mutual eye contact (e.g., for a period of time). This especially may be the case when the origin of the DoA is at (or around) the person who the user has established the mutual eye contact with.

In another aspect, the intent to engage may be based upon other actions of the other person within the environment. For instance, the detector may identify, using an object recognition algorithm upon one or more digital images, that there is a sound source within the environment (e.g., another person). The detector may determine whether this person intends to engage in a conversation with the user, such as performing facial expressions that are indicative of speaking (e.g., mouth moving, and the person looking at the user based on a determined direction of gaze).

In some aspects, the intent to engage detector 14 may produce an engagement confidence signal (or score) based on the determination of whether the user intends to engage in the conversation. For instance, if the user is performing a gesture indicating that the user's attention is directed towards the DoA, the confidence score may increase (e.g., from a low state (e.g., 0) to a high state (e.g., 1)). In one aspect, the confidence score may incrementally change at a particular rate from one state to another. Such changes may reduce (or prevent) false positives. For example, while in a low state the detector may determine that the user intends to engage in a conversation (e.g., based on the user turning towards the DoA). Upon this determination, the detector 14 may begin increasing the confidence score (e.g., at a rate of 0.1 every ms). So long as the user continues to turn towards the DoA (and/or completes the turn and is now facing the DOA), the score may increase until the score reaches a high state. If, however, the user begins to turn away from the DoA, the score may begin to decrease at a same (or different) rate.

In one aspect, the detector 14 is configured to determine whether the user intends to disengage from a conversation. Specifically, the detector may make this determination in an opposite fashion to determining whether the user intends to engage in the conversation. For example, the detector 14 may determine that the user is performing a gesture, such as beginning to walk or move (e.g., from a stationary position). As another example, the user may begin to turn away from the DoA, and/or move away from the DoA (from a stationary position). As another example, the detector may determine that the user intends to disengage based on eye movement or eye gestures (e.g., tracking that the user's eyes are moving away from the DoA. In response, the detector 14 may decrease the confidence score (e.g., from the high state to the low state). In another aspect, the detector 14 may determine that the conversation is complete upon no longer detecting speech within the microphone signals. More about decreasing the confidence score is described herein.

The audio processing engine 10 is configured to obtain a playback signal with user-desired audio content from the input audio source 16 and the confidence score from the intent to engage detector 14, and is configured to adjust the playback signal in response to the detector 14 determining that the user intends to engage in the conversation. Specifically, the audio processing engine may perform one or more audio processing operations when the engagement confidence score indicates that the user intends to engage in a conversation. For instance, the processing engine may perform the operations when the score is in a high state (e.g., a value of 1). As another example, the processing engine may perform one or more operations when the confidence score exceeds a first threshold value (e.g., 0.8). Conversely, the processing engine may cease performing the operations when the score drops to a low state (e.g., a value of 0) and/or drops below a second threshold value, which may be the same or different than the first threshold value. More about performing audio processing operations based on the confidence score exceeding the threshold value is described herein.

In one aspect, the audio processing engine 10 is configured to adjust the playback signal based on the user-desired audio content. The processing engine is configured to determine the type of user-desired audio content that is contained within the playback signal. For instance, the playback signal may contain metadata that describes the type of audio content contained therein, which the engine uses for the determination. In one aspect, the engine may analyze the playback signal to determine the type of audio content. The engine may compare spectral content of the playback signal with predefined spectral content that is associated with types of audio content. In another aspect, the engine may perform any method to determine the type of audio content contained therein.

Upon determining the user-desired audio content, the processing engine 10 may adjust the playback signal by performing one or more audio processing operations. For example, when the user-desired audio content includes speech content, such as a podcast, an audiobook, a movie soundtrack, etc., the processing engine may pause the playback signal. As another example, when the user-desired audio content includes musical content, such as a musical composition, the engine may duck the playback signal. In one aspect, to duck the playback signal the engine may apply a scalar gain to the playback signal in order to reduce a sound output level of the speaker. In another aspect, the processing engine may spectrally shape the playback signal by applying one or more audio processing (e.g., linear) filters (e.g., a low-pass filter, a band-pass filter, a band-stop filter (or notch filter), etc.) to filter out spectral content. For example, the processing engine may apply a notch filter, which has a stopband to attenuate a specific frequency range. In one aspect, the frequency range may include at least a portion of the speech frequency range, as described herein. In another aspect, the stop band may include the entire speech frequency range. As an example, the processing engine may apply reverberation to the playback signal. As another example, the processing engine may apply one or more spatial filters (e.g., Head-Related Transfer Functions (HRTFs) upon the playback signal to spatialize the audio. In some aspects, the processing engine may apply one or more of the audio processing operations described herein to duck the playback signal. More about ducking the playback signal is described herein.

In one aspect, the audio processing engine 10 may determine how to adjust the playback signal based on the detected speech within the environment. Specifically, the processing engine may duck the signal according to speech levels detected in one or more microphone signals. Upon determining that speech levels are low (e.g., below a speech threshold), the playback signal may duck the signal more than if the speech levels were high (e.g., above the speech threshold). Thus, as speech levels decrease (e.g., the conversation is in a library), the engine may (e.g., proportionally) reduce the scalar gain in order to further reduce the sound output level of the speaker (e.g., with gain being a ratio of output to input, as the gain decreases the sound output level will decrease).

In one aspect, the audio processing engine 10 may perform one or more additional audio processing operations. For example, the engine may be configured to equalize (e.g., spectrally shape) the playback signal. In another aspect, the engine may be configured to receive one or more microphone signals from the microphone(s) 6, and may be configured to perform active noise cancellation (ANC) operations to produce anti-noise for output through the speaker 18 in order to reduce ambient noise from the environment. In one aspect, the engine may perform adaptive feedforward ANC, adaptive feedback ANC, or a hybrid approach. For instance, when performing adaptive feedback ANC the audio processing engine may obtain a microphone signal from an "error" (or internal) microphone that is arranged to capture sound at the user's ear (e.g., between the user's ear (or inner ear) and the audio output device 3. The engine may process the error microphone signal according to an adaptive algorithm to determine a feedback ANC filter, which is used to produce the anti-noise signal. In another aspect, the engine is configured to perform ambient sound enhancement (ASE) operations in which sound played back by the (e.g., speaker 18 of the) audio output device 3 is a reproduction of ambient sound that is captured by the device's one or more microphones. Thus, when the output device is a headset, the device may operate in a "transparent" manner, e.g., as if the headset was not being worn by the user. To perform the ASE operations, the engine may process one or more microphone signals with one or more ASE filters, which reduces acoustic occlusion due to the headset being worn over (on or in) the user's ear(s).

In another aspect, the audio processing engine 10 may perform different audio signal processing operations based on whether or not the user is engaged in a conversation. For example, the processing engine may perform an ANC operation upon an error microphone signal to produce an anti-noise signal and send the anti-noise signal (with the playback signal) to drive the speaker 18 while the user is not engaged in a conversation. When, however, the audio processing engine determines that the user intends to engage in the conversation, the engine may suspend the performance of the ANC operation, perform an ASE operation upon a microphone signal to produce an ASE signal, and send the ASE signal to drive the speaker to reproduce the sounds that were captured within the ambient environment by the microphone. In one aspect, the ASE operation may selectively attenuate at least one sound of the ambient environment that was captured by the microphone signal, and in which case the speaker may reproduce at least a portion of the sounds that were captured within the ambient environment when driven by the ASE signal. Once the conversation has terminated (e.g., the confidence score drops below the threshold), the audio processing engine may suspend the ASE operation and continue performing the ANC operation.

As describe herein, the operations for adjusting sound playback to account for speech detection are performed by the (e.g., controller 8 of the) audio output device 3 of the audio system 1. In one aspect, one or more of the operations may be performed by any device of the audio system. In one aspect, the audio source device 2 (when communicatively coupled to the audio output device) may perform one or more of the operations (e.g., using one or more processors and memory integrated therein). For example, the audio output device may transmit sensor data to the audio source device, which then processes the playback signal based on the sensor data. Once processed, the playback signal may be transmitted back to the audio output device to drive the speaker 18. As another example, the sensor data may be obtained from one or more sensors of the audio source device (or another electronic device) rather than (or in addition to) obtaining sensor data from the audio output device. This may be the case when the audio output device is a non-powered audio device, such as wired headphones that are connected to the source device.

Figure 3:
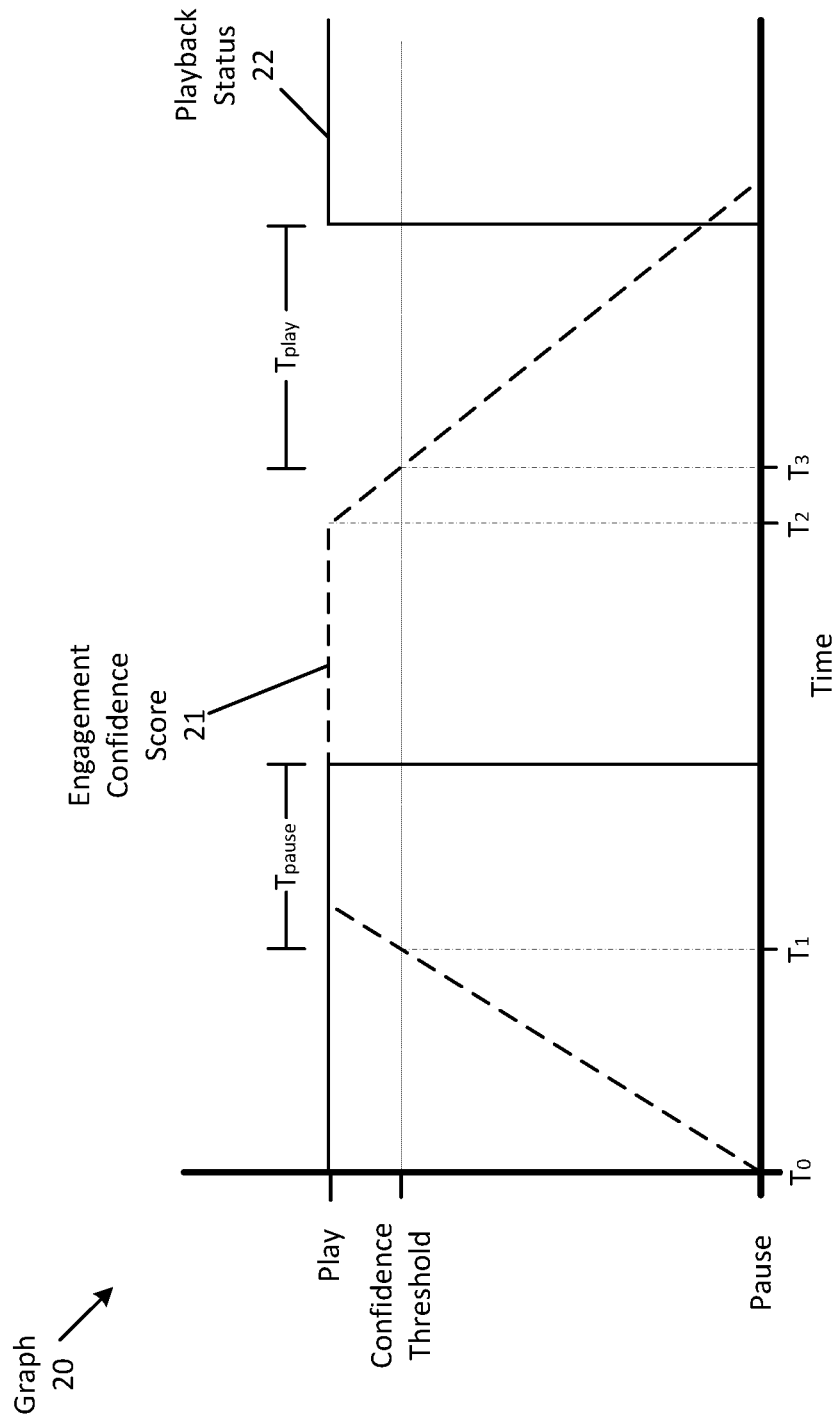
FIG. 3 shows a graph that illustrates pausing a playback signal in response to a user intending to engage in a conversation according to one aspect.
Figure 4:
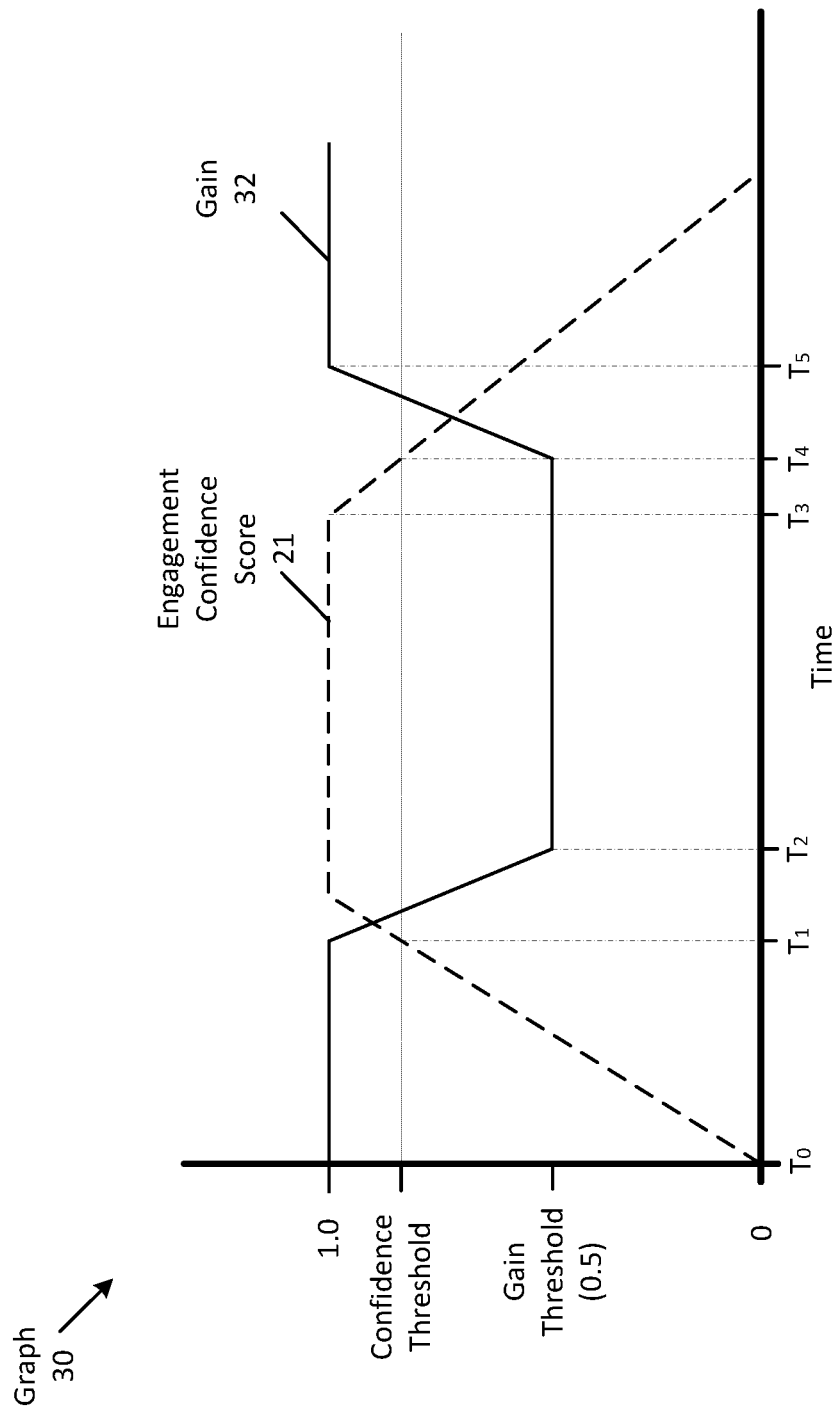
FIG. 4 shows a graph that illustrates ducking a playback signal by applying a scalar gain in response to the user intending to engage in the conversation according to one aspect.
Figure 5:
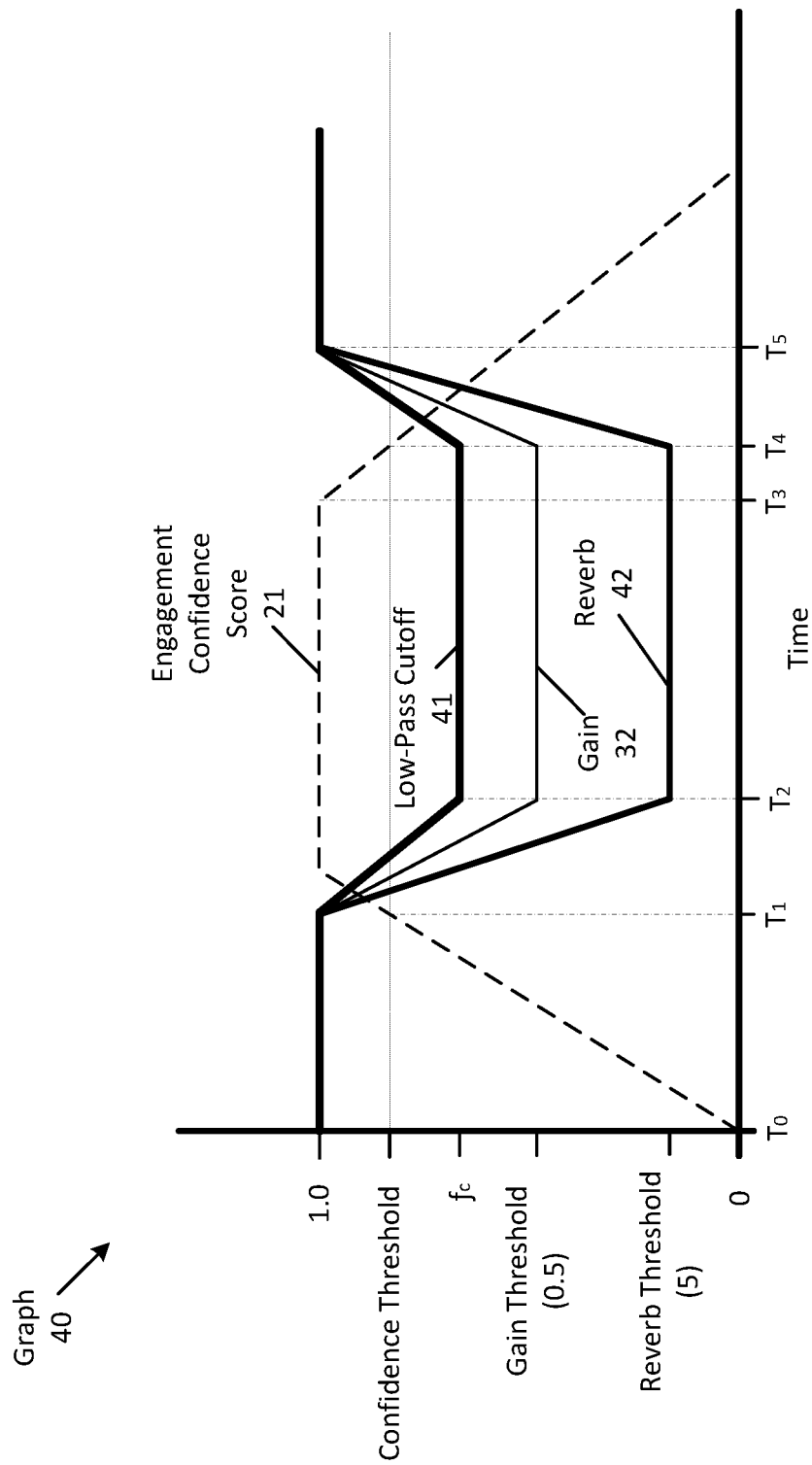
FIG. 5 shows a graph that illustrates ducking a playback signal by applying several signal processing operations upon the playback signal in response to the user intending to engage in the conversation according to one aspect.
Figure 6:
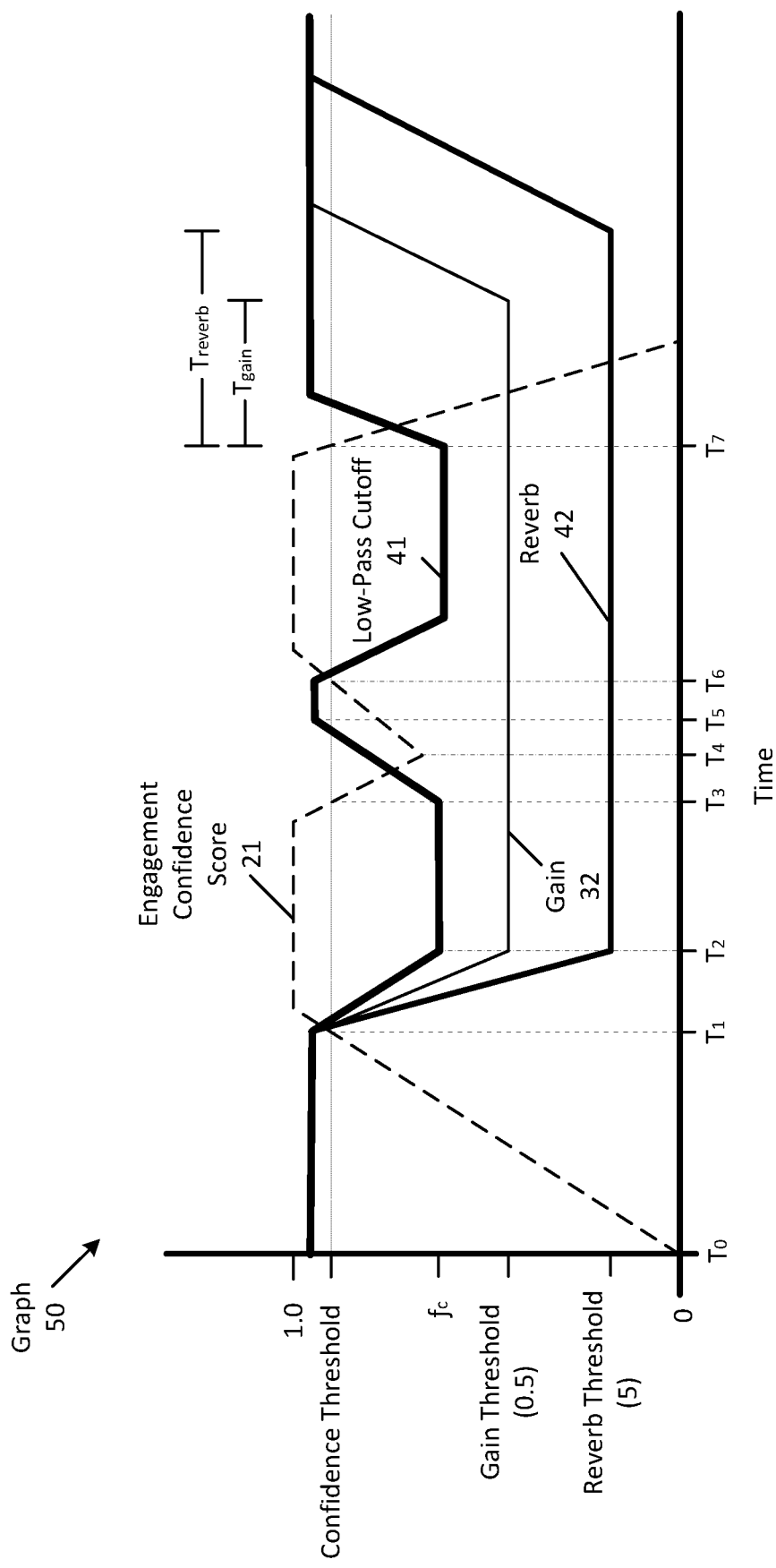
FIG. 6 shows a graph that illustrates a false positive of the user intending to disengage from the conversation according to one aspect.

FIGS. 3-6 show graphs illustrating one or more audio processing operations performed by the audio processing engine 10 in response to the context engine 9 determining that the user intends to engage in the conversation. Specifically, shown in FIGS. 4-6 are a low-pass cutoff 41 for a low-pass filter, a scalar gain 32, and reverberation 42. In one aspect, any of these operations may be performed, while the audio processing engine 10 ducks the playback signal, as described herein. In another aspect, other operations may be performed, as described herein. These figures will be described with reference to FIG. 2.

FIG. 3 shows a graph 20 that illustrates pausing a playback signal in response to a user intending to engage in a conversation according to one aspect. Specifically, this figure shows the engagement confidence score 21 in relation to a playback status 22 of the playback signal with respect to time. In one aspect, this graph represents the audio processing engine pausing and playing the playback signal based on the context engine determining whether the user intends to engage in (and/or disengaged from) a conversation.

The graph 20 begins at $T_0$ at which point the confidence score is low (e.g., at 0), and as a result the audio output device is playing the playback signal. From $T_0$, the confidence score beings to increase with time. In one aspect, the context engine 9 may be determining that the user intends to engage in a conversation (e.g., turning towards a DoA). The audio output device continues to play the playback signal as the confidence score rises (e.g., the score may rise as a product of the user turning towards and then facing a person who is facing and talking towards the user). At $T_1$, the confidence score breaches a confidence score threshold (e.g., 0.8). As shown, the playback status has a lead time or a first period of time ($T_{pause}$) that starts after the confidence score exceeds the threshold in which the audio processing engine continues to play the playback signal. If the confidence score remains above the confidence threshold for at least the lead time, the audio processing engine will then change the playback status to pause the playback signal. In one aspect, the audio processing engine may wait $T_{pause}$ each time the confidence score exceeds the confidence threshold to determine whether to change the playback status. In one aspect, $T_{pause}$ is a predefined period of time. In another aspect it may be user defined. After $T_{pause}$, the playback status 22 changes from play to pause, thereby causing the processing engine to pause the playback signal. In one aspect, the playback status may immediately change once the confidence score exceeds the threshold.

Between $T_1$ and $T_2$, the confidence score continues to increase until it reaches a maximum confidence value (e.g., 1.0), which may represent that the system is confident that the user intends to engage (and/or has engaged) in a conversation (e.g., the user is continuing to look at a person who is speaking based on image data). At $T_2$, the confidence score begins to decrease with respect to time. In one aspect, the confidence score may begin to drop due to the speech detectors 11, 12, and/or 13 no longer detecting speech within one or more microphone signals. At $T_3$, the confidence score drops below the confidence threshold, at which point the audio processing engine may determine whether the score remains below the threshold for a lag time or second period of time ($T_{play}$). In one aspect, $T_{pause}$ is the same as $T_{play}$. In another aspect, the periods of time may differ. After $T_{play}$ and since the confidence score remains below the threshold, the playback status changes from pause to play, which at that time the audio processing engine begins playback again. In one aspect, the lead and lag times ensure that the audio processing engine does not change the playback status as the result of false positives. For example, the confidence score 21 may breach the threshold at $T_1$ but then before $T_{pause}$ ends the score may drop below the threshold (e.g., the person turning towards someone who happens to be talking and immediately walking away). As a result, the system will continue to play the playback signal.

FIG. 4 shows a graph 30 that illustrates ducking a playback signal by applying a scalar gain in response to the user intending to engage in the conversation according to one aspect. In particular, this figure shows the engagement score 21 in relation to a (scalar) gain 32 applied to the playback signal by the audio processing engine with respect to time.

At $T_0$, the confidence score 21 is low, which indicates that the context engine 9 has determined that the user is not intending to engage (or has engaged) in a conversation. As a result, the audio processing engine is not ducking the playback signal, and therefore the gain 32 is at 1.0 (e.g., indicating that the system is not attenuating (or boosting) the signal. From $T_0$, the score increases until it breaches the confidence threshold at $T_1$, at which point the gain 32 begins to decrease. In one aspect, the gain may have a lead time, as described herein. The audio processing engine begins to apply a scalar gain at $T_1$ in order to duck the signal. From $T_1$, the audio processing engine 10 continues to decrease the gain until it reaches a gain threshold at $T_2$. In this case, the threshold is 0.5. Thus, the system reduces the sound output of (or attenuates) the playback signal by 50%. In one aspect, the threshold may be user defined or predefined. The system reduces the gain over a period of time ($T_1$-$T_2$), rather than immediately setting the gain to 0.5 in order to smoothly transition playback from "normal" playback (e.g., without ducking) to ducking the playback signal. In one aspect, the transition time may be predefined or user defined. In one aspect, the gain threshold may be based on the speech level of the detected speech. For instance, the audio processing engine may decrease the threshold (e.g., to 0.75), if the speech level is below a threshold, as described herein.

At $T_3$, the confidence score begins to decrease and at $T_4$ the score drops below the confidence threshold, at which point the gain 32 begins to increase. In one aspect, the gain may have a lag time, as described herein. At $T_5$ the gain 32 returns back to 1.0, at which point the audio processing engine 10 may stop ducking the playback signal. In one aspect, the period of time between $T_4$ and $T_5$ may be the same or different than $T_1$ and $T_2$. Thus, the rate of change of the gain may be the same or different between both periods of time.

FIG. 5 shows a graph 40 that illustrates ducking a playback signal by performing several signal processing operations upon the playback signal in response to the user intending to engage in the conversation according to one aspect. Specifically, this figure shows the engagement confidence score in relation to a low-pass cutoff 41 of a low-pass filter, the gain 32, and reverberation (or reverb) 42 that are each applied to the playback signal by the audio processing engine 10 with respect to time. In other examples, a bandpass filter can be used in addition to or in place of the low-pass filter.

As described herein, the confidence score begins to increase from $T_0$. At $T_1$, the confidence score breaches the confidence threshold, at which point the audio processing engine 10 begins to duck the playback signal. Specifically, the audio processing engine begins to apply (at least one of) 1) a low-pass filter, 2) the gain 32, and 3) reverb 42 to the playback signal to produce an adjusted playback signal for driving the speaker 18. In one aspect, each of these operations are linear operations and therefore may be applied in any order. In another aspect, the audio processing engine 10 may apply the operations in a specific order to produce the adjusted signal. From $T_1$, the audio processing engine adjusts each of the operations until each of them reach respective thresholds at $T_2$. For instance, from $T_1$ to $T_2$, the processing engine may adjust (e.g., reduce) the low-pass cutoff frequency of the applied low-pass filter until reaching fc. In particular, during this time period the cutoff frequency may be reduced from a starting (high) frequency as a function of time. The audio processing engine may perform similar operations with respect to the reverberation. For example, the processing engine may increase the amount of reverberation (e.g., increasing pre-delay, reducing low-pass filter cutoff, etc.) that is added to the playback signal as a function of time, until a reverb threshold of 5 is reached at $T_2$. For example, each value of reverberation may correspond to different values of one or more parameters that are associated with reverberation, such as the pre-delay and low-pass filter cutoff. Thus, a lower reverb value may correspond to less reverberation that is applied to the playback signal. At $T_4$, when the confidence score drops below the confidence threshold, the audio processing engine will begin reducing the applied operations, until at $T_5$ when the audio processing engine stops applying the operations and therefore ceases to duck the signal. In some examples, the amount of time that each signal processing operation takes to reach its corresponding threshold can be different.

FIG. 6 shows a graph 50 that illustrates a false positive of the user intending to disengage from the conversation according to one aspect. This figure is similar to FIG. 5, such that three audio processing operations are applied by the audio processing engine 10 once the engagement confidence score 21 exceeds the confidence threshold at $T_1$. At $T_3$, however, the confidence score 21 drops below the confidence threshold, at which point the low-pass cutoff 41 of the low-pass filter begins to increase. The gain 32 and reverb 42, however, remain the same once the score drops below the threshold because both operations include lag times $T_{gain}$ and $T_{reverb}$ in which the audio processing engine continues to apply the operations, so long as the confidence score remains below the threshold for the given time periods. As shown, both operations have different lag times. In one aspect, the lag times may be the same. In another aspect, at least some of the operations may have lead times, as described in FIG. 3.

Shortly after $T_3$, at $T_4$, the confidence score begins to increase. This sudden change in the confidence score may correspond to the context engine determining that although for a short period of time it appeared the user intended to disengage from the conversation (e.g., by turning away from the DoA), the user still intends to engage in the conversation (e.g., has turned or is turning back towards the DoA). Although the confidence score is increasing, at $T_5$, before the confidence score reaches the confidence threshold the audio processing engine stops applying the low-pass filter. At $T_6$, the confidence score exceeds the confidence threshold, at which point the audio processing engine 10 begins to apply the low-pass filter and begins to reduce the low-pass cutoff 41. Since, however, the period of time $T_3$-$T_6$ is less than $T_{gain}$ and $T_{reverb}$, the audio processing engine maintains the application of both operations. At $T_7$, the confidence score again drops below the confidence threshold, at which pint the low-pass cutoff begins to increase. After $T_{gain}$ the audio processing engine begins to reduce the applied scalar gain 32 and after $T_{reverb}$ the engine begins to reduce the amount of applied reverberation, since after both lag times the confidence score remained below the confidence threshold.

Figure 7:
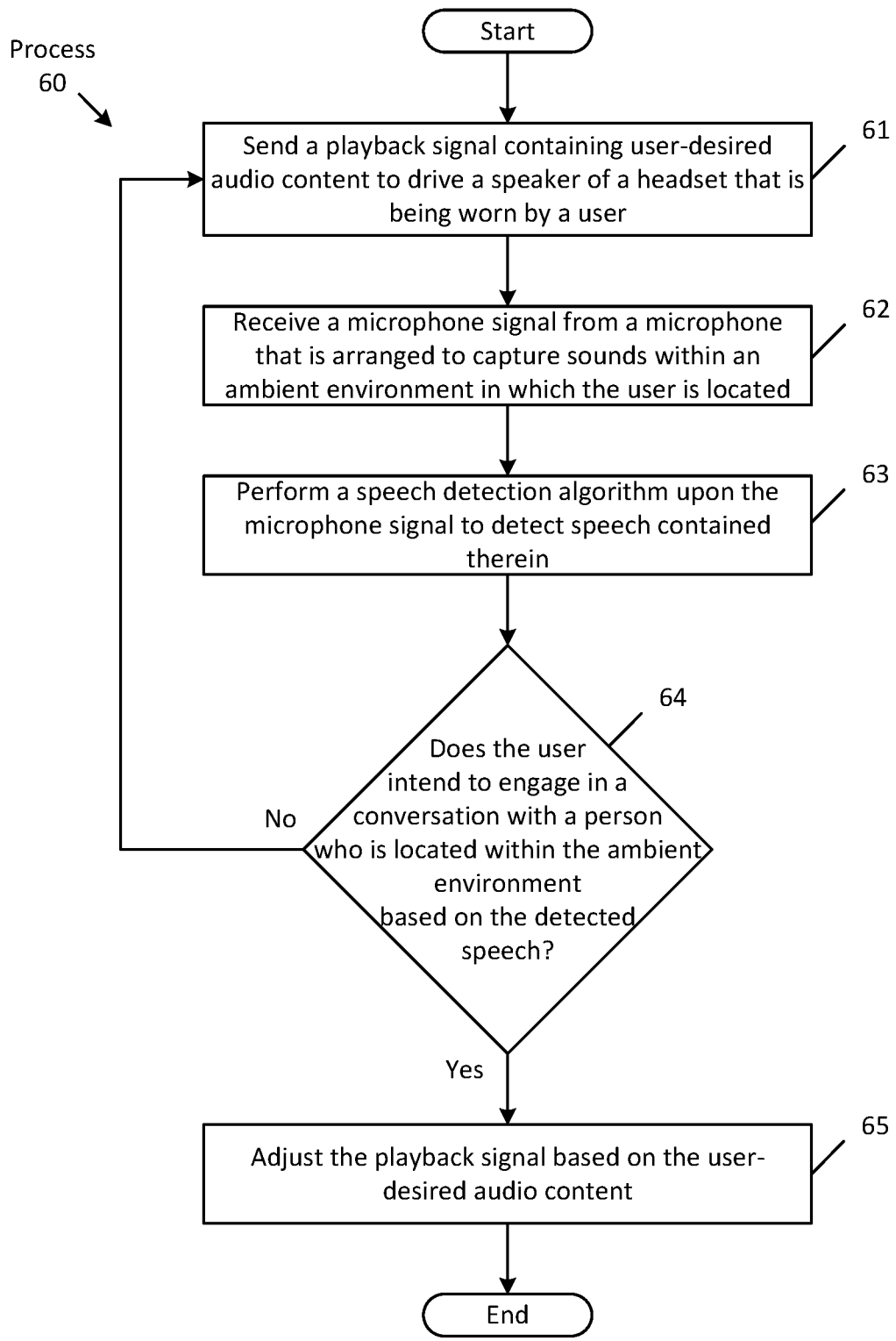
FIG. 7 is a flowchart of one aspect of a process to adjust sound playback to account for speech detection.
Figure 8:
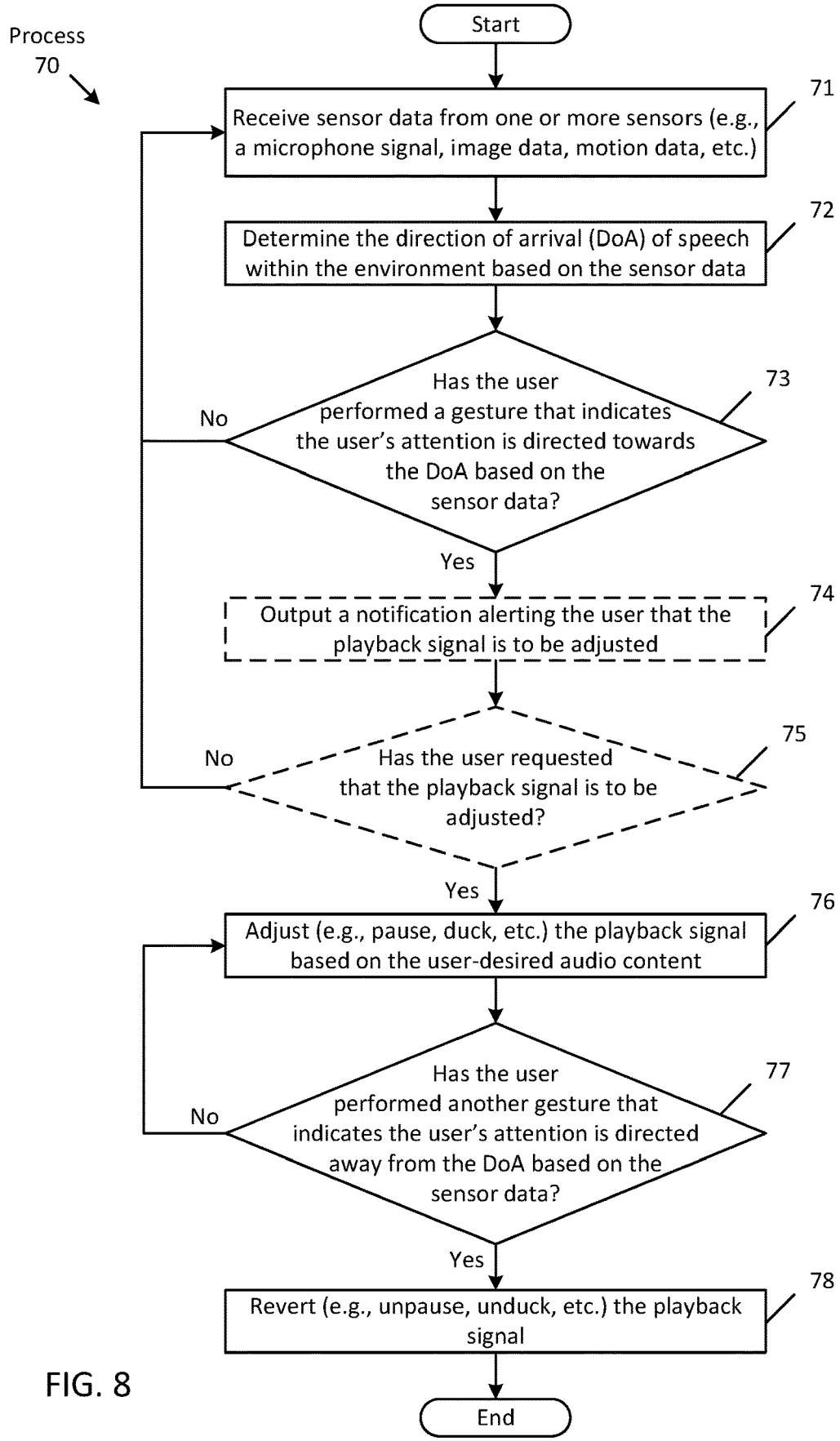
FIG. 8 is a flowchart of one aspect of a process to determine whether the user intends to engage in the conversation.
Figure 9:
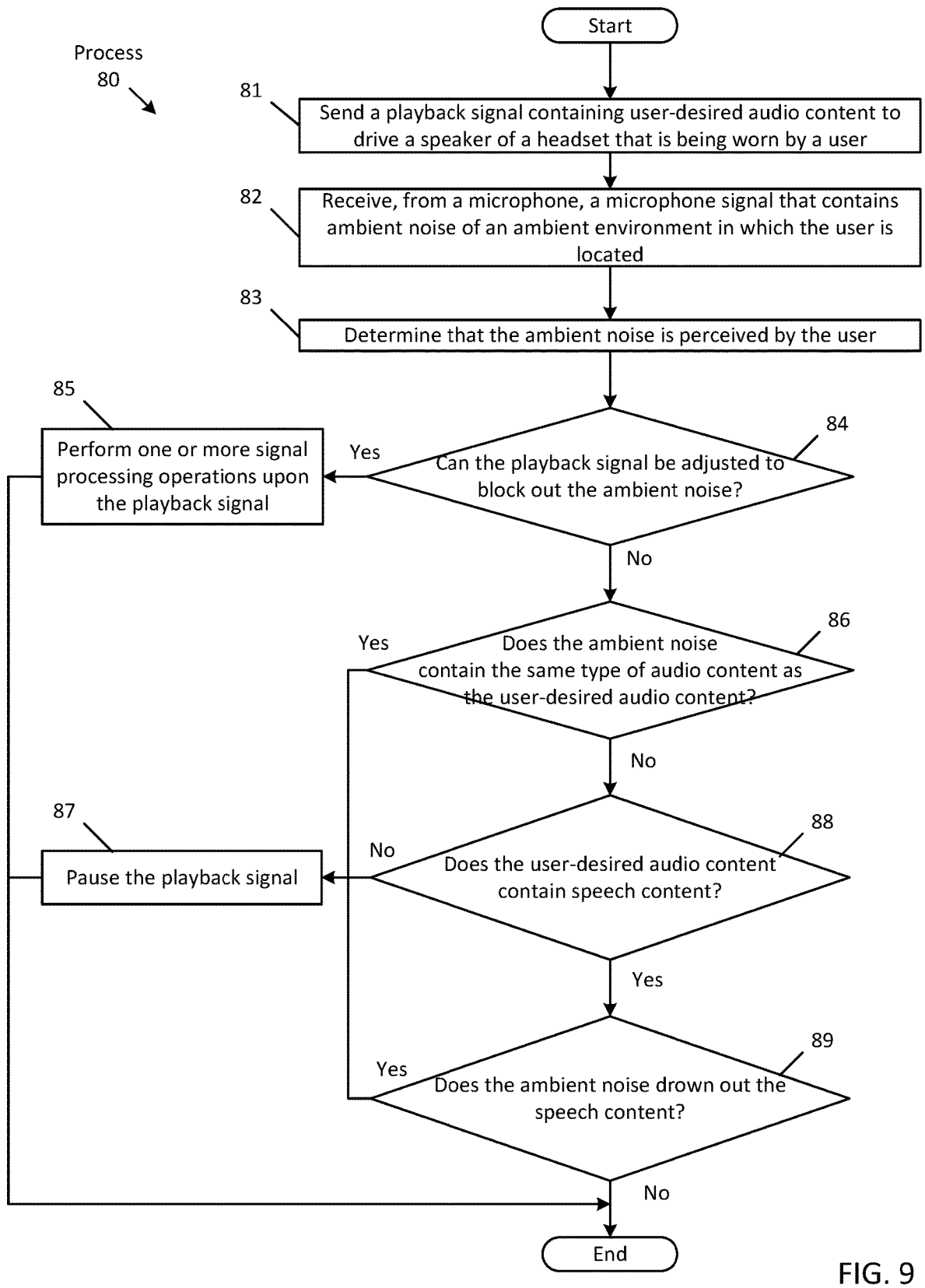
FIG. 9 is a flowchart of one aspect of a process to pause the playback signal in response to determining that ambient noise clashes with the playback signal.

FIGS. 7-9 are flowcharts that each processes 60, 70, and 80, respectively, that may be performed by the (e.g., audio output device 3 of the) audio system 1 described herein. For instance, at least some of the operations of processes 60, 70, and/or 80 may be performed by the (e.g., context engine 9 and/or audio processing engine 10 of the) controller 8 of the audio output device. In another aspect, at least some of the operations may be performed by the audio source device 2 and the audio output device 3 of FIG. 1. In some aspects, at least some of the operations may be performed by another electronic device that is communicatively coupled with the audio source device and/or the audio output device, such as a remote server. Thus, these figures will be described with reference to FIGS. 1 and 2.

FIG. 7 is a flowchart of one aspect of a process 60 to adjust sound playback to account for speech detection. The process 60 begins by sending a playback signal containing user-desired audio content to drive a speaker of a headset that is being worn by a user (at block 61). In particular, the playback signal may be received (from the input audio source 16 and) by the controller 8, which uses the signal to drive the speaker 18. The process 60 receives a microphone signal from a microphone 6 that is arranged to capture sounds within an ambient environment in which the user is located (at block 62). The process 60 performs a speech detection algorithm upon the microphone signal to detect speech contained therein (at block 63). Any of the speech detectors 11-13 may perform speech detection operations to determine whether the microphone is capturing speech.

The process 60 determines whether the user intends to engage in a conversation with a person who is located within the ambient environment based on the detected speech (at decision block 64). Specifically, once speech is detected, the speech detectors 11-13 may determine whom within the ambient environment is speaking, and the intent to engage detector 14 may determine whether the user intends to engage in the conversation based on sensor data from one or more sensors 15. For example, the engage detector may determine whether the user has performed a gesture indicating that the user's attention is directed towards the sound source (or the DoA of the speech). If not, the process 60 returns to block 61. Otherwise, the process 60 proceeds to adjust the playback signal based on the user-desired audio content (at block 65). For instance, the audio processing engine 10 may pause the playback signal when the audio content includes speech content or the engine may duck the playback signal when the audio content includes musical content.

FIG. 8 is a flowchart of one aspect of a process 70 to determine whether the user intends to engage in the conversation. Specifically, at least some of the operations described in this process may be performed in decision block 64 and/or block 65 of process 60 in FIG. 7. The process 70 begins by receiving sensor data from one or more sensors 15, such as a microphone signal from the microphone 6, image data from the camera 5, motion data from the IMU sensor 4, and/or an accelerometer signal from the accelerometer 7. (at block 71). In one aspect, the sensor data may correspond to one or more similar sensors. For instance, the controller 8 may obtain two or more microphone signals from two or more microphones that make up a microphone array of the audio output signal. The process 70 determines a direction of arrival (DoA) of speech within the environment (with respect to the user) based on the sensor data (at block 72). As described herein, the (speech detectors 11-13 of the) context engine 9 may determine the DoA using any DoA estimation method, such as beamforming based on the microphone signals.

The process 70 determines whether the user has performed a gesture that indicates the user's attention is directed towards the DoA based on the sensor data (at decision block 73). For example, the intent to engage detector 14 may perform this determination based on motion data obtained from the IMU sensor 4, as described herein. If so, process 70 outputs a notification alerting the user that the playback signal is to be adjusted (at block 74). Specifically, upon determining that the user intends to engage in a conversation (e.g., upon the engagement confidence score 21 exceeding the confidence threshold), the audio system may output the notification. In one aspect, the notification may be a visual alert (e.g., a pop-up message) that is displayed on a display screen of the audio source device and/or the audio output device. In another aspect, the notification may be an alert audio signal, such that the system outputs the notification by using the alert audio signal to drive the speaker 18. In one aspect, the notification may alert the user that the system is confident that the user is engaged (or about to engage) in a conversation, and that the playback sound is to be adjusted accordingly (e.g., a pop-up message may include text, such as "Your music will be ducked to allow you to engage in a conversation"). In some aspects, when the notification is an alert audio signal, the signal may include a non-verbal sound (e.g., a ding).

The process 70 determines whether the user has requested that the playback signal is to be adjusted (at decision block 75). For instance, a visual alert may include a user-selectable UI item, which when selected (e.g., by pressing upon a touch-sensitive display screen of the audio source device), instructs the audio system to proceed with adjusting the playback signal. In particular, the visual alert may include text indicating how the playback signal may be adjusted if selected by the user (e.g., "Do you want to duck your music?"). In one aspect, the request may be a voice command that is spoken by the user and captured by the microphone 6 (e.g., "Please duck"). In another aspect, the request may be a non-vocal acknowledgement by the user that is captured by one or more sensors 15. For instance, the acknowledgement may be a physical gesture captured by a (e.g., external and/or internal) camera 5, such as the user's head nodding or the user blinking one eye). If so, the process 70 adjusts (e.g., pauses, ducks, etc.) the playback signal based on the user-desired audio content, as described herein (at block 76). Otherwise, the process 70 returns to block 71.

The process 70 determines whether the user has performed another gesture that indicates the user's attention is directed away from the DoA based on the sensor data (at decision block 77). In particular, the intent to engage detector 14 of the context engine 9 may determine whether the user intends to disengage from the conversation, as described herein. In one aspect, the detector may determine whether the user has performed an opposite gesture as was performed by the user to determine that the user's attention was directed toward the DoA, as described herein. For example, the detector may determine whether the user has turned away from the DoA based on motion data captured by the IMU sensor. In one aspect, this may be determined based on motion data from the IMU sensor and/or based on whether the user's direction of gaze has moved away from the DoA. In one aspect, the detector may perform this determination based on whether the user has stopped speaking for a period of time (e.g., ten seconds). In this example, the detector may monitor microphone signals captured by microphone 6 to determine whether speech is contained therein for the period of time. In another aspect, the detector may determine whether the person(s) whom the user has engaged in the conversation with has performed a gesture that indicates they have disengaged from the conversation. For instance, the detector may determine whether the person has walked away (e.g., based on image data captured by the camera 5), or whether the person has stopped talking (e.g., based on microphone signals captured by the microphone 6). In one aspect, this determination may be based on one or several factors as described herein (e.g., based on a combination of the user turning away from the DoA and the person walking away).

In one aspect, the determination of whether the user's attention is directed away from the DoA, which may be indicative of the user intending to disengage from the conversation may be based on a lowering of the confidence score. For instance, the intent to engage detector 14 may lower the confidence score based on whether the user is performing one or more gestures that indicate the user's attention is directed away from the DoA, as described herein. In one aspect, the more gestures (over a period of time) the user is performing, the lower the confidence score will drop. Once the score drops below the confidence score threshold, the process reverts (e.g., unpauses, unducks, etc.) the playback signal by ceasing to adjust the playback signal (at block 78). In other words, upon determining that the score has dropped below the confidence score, the audio output device begins to playback the playback signal in a similar fashion as before the score had exceeded the threshold. Specifically, the audio processing engine 10 begins ceasing to apply the one or more audio processing operations that were applied to adjust the playback signal. In one aspect, the process may wait for a period of time (e.g., two seconds) before reverting the playback signal to ensure that the confidence score does not increase back above the confidence threshold.

Some aspects perform variations of the process 70 described in FIG. 8. For example, the specific operations of at least some of the processes may not be performed in the exact order shown and described. The specific operations may not be performed in one continuous series of operations and different specific operations may be performed in different aspects. In one aspect, the determinations made in decision block 73 be based on whether the engagement confidence score produced by the intent to engage detector 14 exceeds the confidence threshold. For instance, at decision block 73, the process 70 may determine whether the confidence score exceeds the confidence threshold. This may occur based on a detected gesture performed by the user (e.g., turning towards the DoA), as described herein.

As described thus far, the context engine determines whether the user intends to engage in a conversation and, in response produces an engagement confidence score, which the audio processing engine uses to adjust the playback signal (when the score exceeds the threshold). In one aspect, the context engine may produce the confidence score based upon a determination of whether the user intends to listen to (or pay attention to) an audio sound source. For instance, the sound source may be something other than a person, such as a television, a radio, an intercom, etc. The context engine may perform similar operations as described herein to determine whether the user intends to listen to the sound source. For example, upon detecting a DoA of a sound source, the engine may determine whether the user has performed a gesture that indicates that the user's attention is directed towards the DoA, such as turning towards a television. If so, the engine may produce a high confidence score, which when exceeding the confidence threshold may adjust a playback signal, as described herein.

FIG. 9 is a flowchart of one aspect of a process 80 to pause the playback signal in response to determining that ambient noise clashes with the playback signal. Specifically, this process includes operations to adjust the sound playback (e.g., pause the playback signal), in response to determining that ambient noise clashes with the user-desired audio content, as described herein. The process 80 begins by sending a playback signal containing user-desired audio content to drive a speaker (e.g., speaker 18) of a headset (e.g., device 3) that is being worn by a user (at block 81). The process 80 receives, from a microphone, a (first) microphone signal that contains ambient noise of an ambient environment in which the user is located (at block 82). For instance, the microphone may be an external microphone that is arranged to capture ambient noises, as described herein.

The process 80 determines that the ambient noise is perceived by the user (at block 83). Specifically, the audio system 1 may use one or more microphones 6 (e.g., an internal microphone) to determine whether ambient noise is leaking into the user's ear (e.g., not being passively attenuated based on the physical characteristics of the headset and/or not being actively attenuated based on ANC operations being performed by the system). For instance, the system may receive, from an internal microphone, a (second) microphone signal that contains sound captured by the internal microphone at or near the user's ear. For example, the internal microphone may be an error microphone that is integrated into an inner portion of an carcup of headset (e.g., a portion directed towards the user). In this case, the microphone may be arranged such that is captures sound in or around the user's ear canal. In another aspect, the second microphone signal may be produced by a microphone that is positioned elsewhere, such as another external microphone (e.g., integrated on the outside of the carcup). The system may determine that the sound includes the user-desired audio content and the ambient noise of the ambient environment. In one aspect, the system may determine that the second microphone signal includes ambient noise based on the playback signal (e.g., based on correlation between the playback signal and the second microphone signal). For instance, if the second microphone signal does not correlate the playback signal by a threshold, it may be determined that other sounds, such as ambient noise, is mixing with the sound being produced by the speaker. In another aspect, the system may perform this determination based on whether at least a portion of the first microphone signal correlates with the second microphone signal (e.g., based on whether portions between the two signals are similar). In some aspects, the determination may be based on a user action. For instance, upon determining that the user has pressed a button (e.g., a volume button of the audio source device 2) and determining that there is ambient noise (e.g., based on the first microphone signal exceeding a threshold value), the system may determine that the user may perceive the noise.

In one aspect, the system may determine that the user is perceiving the ambient noise based on determining that the ambient noise is masking (at least a portion) of the playback signal at the user's ear. Audible masking occurs when the perception of one sound is affected by the presence of another sound. In this case, the system determines whether the ambient noise prevents (or reduces) the user's perception of sound produced by the speaker when driven with the playback signal. To make this determination, the system determines a sound output level (e.g., sound pressure level (SPL) value) of the speaker, and determines an ambient noise level of the ambient noise (e.g., from the first microphone signal). The system determines whether the ambient noise level exceeds (or matches) the sound output level of the speaker. If so, the ambient noise is masking the playback signal. In one aspect, this determination may be frequency dependent, meaning that a determination of masking may be made based on whether a level of at least one frequency component of the ambient noise exceeds at least one frequency component (being in the same frequency range or different range) of the playback signal.

In one aspect, the system may determine that the ambient noise is masking the playback signal by applying an ambient noise model that represents the effect of ambient noise at the user's ear. For instance, the system may apply the model to one or more microphone signals (captured by external microphones), to produce a modeled ambient noise signal. The system may compare the ambient noise signal to the playback signal to determine whether the level (of at least some spectral components) of the noise signal exceeds a level of the playback signal. If so, the system may determine that the ambient noise is (at least partially) masking the playback signal at the user's ear.

The process 80 determines whether the playback signal may be processed (or adjusted) to block out the ambient noise that is being perceived by the user (at decision block 84). Specifically, the system determines whether the playback signal may be processed to produce a processed playback signal which when sent and used to drive the speaker of the headset, causes the speaker to produce sound (containing the user-desired audio content) that masks at least a portion of the ambient noise at the user's ear. In one aspect, to make this determination, the system determines a sound output level (e.g., sound pressure level (SPL) value) of the speaker that may act as a masking threshold, where sounds (such as the ambient noise) having a sound level below the masking threshold are indistinguishable from the sound produced by the speaker to the user. The system determines an ambient noise level of the ambient noise (e.g., from the first microphone signal), and determines a sound output level of the speaker at the user's ear. In some aspects, the sound output level may be determined by processing the second microphone signal to determine the sound output level. In another aspect, the sound output level may be determined according to settings of the audio system, such as receiving a user-defined volume level of the system as the sound output level. The system determines a masking threshold based on the ambient noise level and the sound level, where the masking threshold is greater than the sound output level. In one aspect, the masking threshold may be greater since it has been determined that the ambient noise is being perceived by the user, and thus the sound that is currently being produced by the speaker is not sufficient to mask the ambient noise. In one aspect, the masking threshold may be frequency dependent, such that the masking threshold corresponds to a particular frequency component. For example, the masking threshold may be within a frequency range of speech, as described herein.

Upon determining the masking threshold, the system may determine whether the system is able to process the playback signal in order for the speaker to achieve such a sound output level that would mask the ambient noise. In one aspect, the system may determine whether the sound output level for the speaker may be increased to at least match the masking threshold based on device characteristics of the headset. Specifically, the system determines whether one or more audio processing operations may be performed upon the playback signal in order for the sound output level to overcome (or meet) the masking threshold. For example, the system may determine whether the volume of the system may be increased (e.g., by applying a scalar gain upon the playback signal) based on a current volume setting or a user setting (e.g., a setting indicating that the volume cannot exceed a threshold). As another example, the system may determine whether the playback signal may be spectrally shaped (e.g., by applying equalization operations) in order for one or more frequency components of the playback signal to exceed the masking threshold that corresponds to that frequency component. In another aspect, the system may determine whether one or more filters (e.g., low-pass filters, etc.) may be to the playback signal in order to reduce high frequency noise. In one aspect, the system may determine whether other signal processing operations may be performed in order to mask the ambient noise. For example, the system may determine whether the performance of ANC operations may produce an anti-noise signal, which when used to drive the speaker may cancel out the ambient noise (or at least a portion of the ambient noise). In this case, the playback signal may be processed by combining the playback signal with the anti-noise signal to produce a combined audio signal as the processed playback signal for output through the speaker. In response to determining that the playback signal may be processed, the process 80 performs the one or more audio processing operations upon the playback signal to produce the processed playback signal, which the system uses to drive the speaker (at block 85).

If, however, the playback signal cannot be processed to mask the ambient noise, the process 80 determines whether the ambient noise contains the same type of audio content as the user-desired audio content (at decision block 86). Specifically, the system may analyze the ambient noise to determine the type of audio content contained therein (e.g., whether it contains speech content, musical content, etc.). In one aspect, the system may perform a table lookup using spectral content of the ambient noise into a data structure that associates spectral content with predefined types of audio content. For example, speech content may lie in a range of 100-8,000 Hz. Thus, if the ambient noise contains spectral content that is mostly (or entirely) within that range, the system may determine that the ambient noise contains speech content. In another aspect, the system may transmit the ambient noise to a separate electronic device (e.g., a remote server), which may perform audio content identification operations). After which, the remote server may transmit an indication of the type of audio content contained within the ambient noise. In one aspect, the system may perform similar operations to determine the type of user-desired audio content is contained within the playback signal. In another aspect, the system may determine the type of user-desired audio content based on metadata associated with the playback signal, as described herein. If the ambient noise contains the same type of audio content as the user-desired audio content (e.g., both are musical content or both are speech content), the process 80 pauses the playback signal (at block 87). Thus, the playback signal may be paused when the user-desired audio content is the same type of audio content as the type of audio content of the ambient noise and when the playback signal cannot be processed to mask the ambient noise at the user's ear.

Otherwise, the process 80 determines whether the user-desired audio content contains speech content (at decision block 88). If not, the process 80 pauses the playback signal at block 87. Otherwise, the system determines whether the ambient noise drowns out the speech content (at decision block 89). Specifically, the system determines whether the ambient noise is entirely (or at least partially) masking the speech content such that the user cannot hear (or cannot understand) the speech content. For instance, the system may determine whether one or more spectral components of the speech content is being masked by the ambient noise. In one aspect, the spectral components may lie in a range (which includes the endpoints) of 100-8,000 Hz, which may be a frequency range of at least some speech. In another aspect, the system may determine whether the ambient noise masks a threshold number of spectral components. If so, the process 80 pauses the playback signal.

Some aspects perform variations of the process 80 described in FIG. 9. For example, the specific operations of at least some of the processes may not be performed in the exact order shown and described. The specific operations may not be performed in one continuous series of operations and different specific operations may be performed in different aspects.

In one aspect, at least some of the operations of described herein (e.g., in processes 60, 70, and/or 80 of FIGS. 7-9, respectively, may be performed by a machine learning algorithm that is configured to detect speech, determine whether the user intends to engage in a conversation based on sensor data, and, in response to determining that the user intends to engage in the conversation, adjust a playback signal based on user-desired audio content of the signal. In another aspect, the machine learning algorithm may include one or more neural networks (e.g., convolution neural networks, recurrent neural networks, etc.) that are configured to perform the operations described herein.

In one aspect, at least some of the operations described herein are optional operations that may or may not be performed. In particular, blocks that are illustrated as having dashed or dotted boundaries may optionally be performed. For instance, block 74 and/or decision block 75 in process 70 of FIG. 8 may not be performed. In that case, upon determining that the user has performed the gesture, the process 70 may proceed directly to adjusting the playback signal at block 76.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

As previously explained, an aspect of the disclosure may be a non-transitory machine-readable medium (such as microelectronic memory) having stored thereon instructions, which program one or more data processing components (generically referred to here as a "processor") to perform operations to adjust the sound playback to account for speech detection and/or in response to determining ambient noise clashes with user-desired audio content, network operations, signal processing operations, and audio signal processing operations. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by an audio system comprising a headset, the method comprising:
    playing back sound through a speaker of the headset that is being worn by a user;
    determining, using a plurality of microphones of the headset, a direction of arrival (DoA) of a sound source within an ambient environment in which the user is located;
    determining a direction towards which the user has performed a physical gesture; and
    adjusting, responsive to determining that the direction towards which the user has performed the physical gesture is directed towards the DoA and based on audio content of the sound, playback of the sound.

2. The method of claim 1 further comprising:
    receiving sensor data from a sensor of the headset; and
    determining the physical gesture as at least one of 1) the user moving towards the DoA, 2) the user turning towards the DoA, 3) the user moving with the DoA, and 4) the user moving and then stopping towards the DoA, based on the sensor data.

3. The method of claim 1 further comprising:
    receiving image data captured by a camera, the image data comprises eyes of the user; and
    determining the physical gesture as a direction of gaze of the eyes of the user directed towards the DoA.

4. The method of claim 1, wherein adjusting playback of the sound comprises reducing a sound output level of the speaker based on the audio content comprising musical content.

5. The method of claim 1, wherein adjusting playback of the sound comprises pausing playback based on the audio content comprising speech.

6. The method of claim 1 further comprising detecting, using at least one microphone of the plurality of microphones of the headset, speech within the ambient environment, wherein playback of the sound is adjusted by reducing a sound output level of the speaker based on a sound level of the speech.

7. The method of claim 1 further comprising:
    receiving, from at least one microphone of the plurality of microphones, a microphone signal that includes a sound of the sound source; and
    playing back, responsive to determining that the user has performed the physical gesture directed towards the DoA, the sound of the sound source by driving the speaker using the microphone signal.

8. An audio system comprising:
    at least one processor; and
    memory having instructions stored therein which when executed by the at least one processor causes the audio system to:
        send an audio signal comprising a sound to drive a speaker of a headset that is being worn by a user,
        determine, using a plurality of microphones, a direction of arrival (DoA) of a sound source within an ambient environment in which the user is located,
        determine a direction towards which the user has performed a physical gesture, and
        adjust, responsive to determining that the direction towards which the user has performed the physical gesture is directed towards the DoA and based on audio content of the sound, the audio signal.

9. The audio system of claim 8, wherein the sound source is a person other than the user within the ambient environment, wherein the physical gesture indicates an intent of the user to engage in a conversation with the person.

10. The audio system of claim 8, wherein the audio signal is adjusted by applying at least one of 1) a low-pass filter, 2) a gain, and 3) reverberation to the audio signal.

11. The audio system of claim 8, wherein the physical gesture is a first gesture, wherein the memory has further instructions to:
    determine that the user has performed a second gesture away from the DoA of the sound source; and
    after a period of time from when a determination has been made that the user has performed the second gesture, cease adjusting the audio signal.

12. The audio system of claim 8, wherein the memory comprises further instructions to detect, using the plurality of microphones, speech within the ambient environment having originated from the sound source based on the DoA, wherein the audio signal is adjusted responsive to detecting the speech.

13. The audio system of claim 8, wherein the memory has further instructions to:
    receive sensor data from a sensor; and
    determine the physical gesture as at least one of 1) the user moving towards the DoA, 2) the user turning towards the DoA, 3) the user moving with the DoA, and 4) the user moving and then stopping towards the DoA, based on the sensor data.

14. The audio system of claim 8, wherein the audio signal is a first audio signal, wherein the memory has further instructions to:
    capture, using at least one microphone of the plurality of microphones, a sound of the ambient environment; and
    send, responsive to determining that the user has performed the physical gesture directed towards the DoA, a second audio signal that includes the sound of the ambient environment to drive the speaker.

15. A headset comprising:
    a plurality of microphones;
    a speaker;
    at least one processor; and
    memory having instructions which when executed by the at least one processor causes the headset to:
        play back sound through the speaker of the headset that is being worn by a user;
        determine, using the plurality of microphones of the headset, a direction of arrival (DoA) of a sound source within an ambient environment in which the user is located;
        determine a direction towards which the user has performed a physical gesture; and
        adjust, responsive to determining that the direction towards which the user has performed the physical gesture is directed towards the DoA and based on audio content of the sound, playback of the sound.

16. The headset of claim 15 further comprising a sensor, wherein the memory has further instructions to:
    receive sensor data from the sensor; and
    determine the gesture as at least one of 1) the user moving towards the DoA, 2) the user turning towards the DoA, 3) the user moving with the DoA, and 4) the user moving and then stopping towards the DoA, based on the sensor data.

17. The headset of claim 15, wherein the memory has further instructions to perform an acoustic noise cancellation (ANC) operation to play back anti-noise through the speaker.

18. The headset of claim 17, wherein the memory has further instructions to, responsive to determining that the user has performed the physical gesture directed towards the DoA,
   suspend performing the ANC operation; and
   begin performing an ambient sound enhancement operation to play back a sound captured by at least one microphone of the plurality of microphones through the speaker.

19. The headset of claim 15, wherein the memory comprises further instructions to detect, using the plurality of microphones, speech within the ambient environment having originated from the sound source based on the DoA, wherein playback of the sound is adjusted responsive to detecting the speech.

20. The headset of claim 19, wherein playback is adjusted by pausing playback based on a detection of speech and based on the audio content of the sound.

\* \* \* \* \*